(12) United States Patent
Miyachi et al.

(10) Patent No.: US 11,248,065 B2
(45) Date of Patent: Feb. 15, 2022

(54) ACTIVE ENERGY RAY-CURABLE RESIN COMPOSITION, RESIN MOLDED ARTICLE, AND METHOD FOR PRODUCING RESIN MOLDED ARTICLE

(71) Applicant: Mitsubishi Chemical Corporation, Chiyoda-ku (JP)

(72) Inventors: Akira Miyachi, Chiyoda-ku (JP); Riina Kanbara, Chiyoda-ku (JP); Masashi Serizawa, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 471 days.

(21) Appl. No.: 16/217,635

(22) Filed: Dec. 12, 2018

(65) Prior Publication Data

US 2019/0112409 A1  Apr. 18, 2019

Related U.S. Application Data

(63) Continuation of application No. PCT/JP2017/023810, filed on Jun. 28, 2017.

(30) Foreign Application Priority Data

Jul. 1, 2016  (JP) .............................. JP2016-131847

(51) Int. Cl.

| | | |
|---|---|---|
| *B29C 35/08* | (2006.01) | |
| *C08F 2/50* | (2006.01) | |
| *C08F 2/46* | (2006.01) | |
| *C08G 61/04* | (2006.01) | |
| *C08F 2/44* | (2006.01) | |
| *C08F 299/06* | (2006.01) | |
| *C08G 18/75* | (2006.01) | |
| *C08F 290/06* | (2006.01) | |
| *C09D 175/16* | (2006.01) | |
| *C08G 18/24* | (2006.01) | |
| *C08G 18/79* | (2006.01) | |
| *C08F 222/10* | (2006.01) | |
| *C08G 18/67* | (2006.01) | |
| *B32B 27/30* | (2006.01) | |
| *C09D 4/06* | (2006.01) | |
| *C09D 183/06* | (2006.01) | |
| *C08J 7/04* | (2020.01) | |
| *C08J 7/043* | (2020.01) | |
| *C08J 7/046* | (2020.01) | |
| *C08F 299/08* | (2006.01) | |
| *B29C 41/00* | (2006.01) | |

(Continued)

(52) U.S. Cl.

CPC .............. *C08F 2/44* (2013.01); *B29C 35/0805* (2013.01); *B29C 41/003* (2013.01); *B32B 27/30* (2013.01); *C08F 2/50* (2013.01); *C08F 222/1006* (2013.01); *C08F 290/067* (2013.01); *C08F 299/06* (2013.01); *C08F 299/08* (2013.01); *C08G 18/246* (2013.01); *C08G 18/6725* (2013.01); *C08G 18/758* (2013.01); *C08G 18/792* (2013.01); *C08J 7/043* (2020.01); *C08J 7/046* (2020.01); *C08J 7/0427* (2020.01); *C09D 4/06* (2013.01); *C09D 175/16* (2013.01); *C09D 183/06* (2013.01); *B29K 2033/04* (2013.01); *B29K 2869/00* (2013.01); *B29L 2011/0016* (2013.01); *C08J 2369/00* (2013.01); *C08J 2433/08* (2013.01); *C08J 2453/00* (2013.01)

(58) Field of Classification Search

CPC ........ C08L 33/066; C08L 33/08; C08L 33/14; C08L 33/00; C08L 2201/10; C08K 3/36; C08K 3/013; C08K 3/40; C08K 5/0025; C08K 5/08; C08K 5/5397; C08K 5/205; C08K 2201/005; C08K 2201/011; C08F 220/20; C08F 220/34; C08F 220/286; C08F 220/56; C08F 2/50; C08F 236/20; C08F 222/102; C08F 2800/20; B33Y 10/00; B33Y 70/00; B33Y 80/00; B29C 64/124

USPC .......... 264/494, 405; 522/6, 71, 189, 184, 1; 520/1

See application file for complete search history.

(56) References Cited

U.S. PATENT DOCUMENTS 5,466,491 A * 11/1995 Factor ..................... C08K 9/04
                                                         427/515
5,990,188 A    11/1999 Patel et al.
(Continued)

FOREIGN PATENT DOCUMENTS

CN      103102793 A     5/2013
EP      2 011 837 A1    1/2009
(Continued)

OTHER PUBLICATIONS

Midorikawa, JP 2009-035680 Machine Translation, Feb. 19, 2009 (Year: 2009).*

(Continued)

*Primary Examiner* — Jessica Whiteley
(74) *Attorney, Agent, or Firm* — Oblon, McClelland, Maier & Neustadt, L.L.P.

(57) ABSTRACT

An active energy ray-curable resin composition which contains (A) inorganic oxide particles each having an organic functional group on the surface, (B) a siloxane oligomer which has at least one functional group selected from the group consisting of a (meth)acryloyl group, an epoxy group and a vinyl group, while having a weight average molecular weight of 200-3,000, (C) a polyfunctional (meth)acrylate having a specific structure, (D) a urethane (meth)acrylate having two or more (meth)acryloyl groups in each molecule, and (E) an ultraviolet absorbent.

17 Claims, No Drawings

(51) Int. Cl.
*B29K 33/04* (2006.01)
*B29L 11/00* (2006.01)

(56) References Cited

U.S. PATENT DOCUMENTS

| | | | |
|---|---|---|---|
| 6,160,067 | A | 12/2000 | Eriyama et al. |
| 2009/0111904 | A1 | 4/2009 | Odaka et al. |
| 2013/0084458 | A1 | 4/2013 | Yamada et al. |
| 2014/0178692 | A1 | 6/2014 | Haubrich et al. |
| 2017/0015774 | A1* | 1/2017 | Miyachi ................ B05D 1/305 |
| 2017/0183515 | A1* | 6/2017 | Ito ........................ C08K 5/005 |

FOREIGN PATENT DOCUMENTS

| | | | |
|---|---|---|---|
| JP | 3-14879 | | 1/1991 |
| JP | 3-14879 | A | 1/1991 |
| JP | 7-109355 | | 4/1995 |
| JP | 7-109355 | A | 4/1995 |
| JP | 8-206596 | | 8/1996 |
| JP | 9-100111 | | 4/1997 |
| JP | 2002-234906 | | 8/2002 |
| JP | 2002-234906 | A | 8/2002 |
| JP | 2004-75785 | | 3/2004 |
| JP | 2004-75785 | A | 3/2004 |
| JP | 2004-212619 | | 7/2004 |
| JP | 2004-212619 | A | 7/2004 |
| JP | 2009-6513 | | 1/2009 |
| JP | 2009-6513 | A | 1/2009 |
| JP | 2009-35680 | | 2/2009 |
| JP | 2009-35680 | A | 2/2009 |
| JP | 2009035680 | * | 2/2009 |
| JP | 2010-254840 | | 11/2010 |
| JP | 2010-254840 | A | 11/2010 |
| JP | 2010254840 | * | 11/2010 |
| JP | 2013-76029 | | 4/2013 |
| JP | 2013-119553 | | 6/2013 |
| JP | 2013-119553 | A | 6/2013 |
| JP | 2015-67776 | | 4/2015 |
| JP | 2015-67776 | A | 4/2015 |
| JP | 2016-505682 | | 2/2016 |
| KR | 2002-0020599 | A | 3/2002 |
| TW | 201323536 | A1 | 6/2013 |
| WO | WO 2015/137279 | A1 | 9/2015 |
| WO | WO 2015/152140 | A1 | 10/2015 |
| WO | WO 2015/152171 | A1 | 10/2015 |
| WO | WO-2015152171 | A1 * | 10/2015 ............... C09D 7/68 |

OTHER PUBLICATIONS

Furukawa et al, JP 2010-254840 Machine Translation, Nov. 11, 2010 (Year: 2010).*
Hakoshima et al, WO 2015-152171 Machine Translation, Oct. 8, 2015 (Year: 2015).*
Combined Chinese Office Action and Search Report dated Jul. 3, 2020, in Patent Application No. 201780034961.6 (with English translation), 28 pages.
Extended European Search Report dated May 14, 2019 in Patent Application No. 17820234.7, 11 pages.
Indian Office Action dated Aug. 31, 2020 in Patent Application No. 201817049228 (with partial English translation), 12 pages.
Combined Office Action and Search Report dated May 9, 2018 in corresponding Taiwanese Patent Application No. 106121533 (with English Translation), 10 pages.
International Search Report dated Sep. 19, 2017 in PCT/JP2017/023810, filed on Jun. 28, 2017.
Written Opinion dated Sep. 19, 2017 in PCT/JP2017/023810, filed on Jun. 28, 2017.

* cited by examiner

ACTIVE ENERGY RAY-CURABLE RESIN COMPOSITION, RESIN MOLDED ARTICLE, AND METHOD FOR PRODUCING RESIN MOLDED ARTICLE

TECHNICAL FIELD

The present invention relates to an active energy ray-curable resin composition and a resin molded article. The active energy ray-curable resin composition, for example, is useful in an automobile exterior member.

BACKGROUND ART

In general, a molded article formed of a polycarbonate resin, a polymethyl methacrylate resin, or a polystyrene resin, is not only lightweight and excellent in molding properties, but also excellent in transparency, and excellent in impact resistance compared to a glass product. For this reason, the molded article is widely used in various lamp lenses, window materials, covers of indicators, and the like, as a glass substitute material. In particular, in a headlamp lens, the use of a plastic material increases according to diversification of automobile design, or the like. In addition, recently, a polycarbonate resin molded article excellent in impact resistance, has been generally used in window glass or sunroof, in order for a lightweight automobile.

However, the polycarbonate resin molded article has insufficient wear resistance or abrasion resistance on a front surface, and thus, the front surface is easily damaged due to contact, friction, scratch, or the like with other hard substances, and a commodity value decreases due to the damage on the front surface.

In addition, in a case where the polycarbonate resin molded article is used as an automotive member, the polycarbonate resin molded article is used outdoors, and thus, weather resistance also becomes important. A polycarbonate resin has low weather resistance, is easily degraded by an active energy ray such as an ultraviolet ray included in solar light, and a molded article of the polycarbonate resin is considerably yellowed, or has a crack on a front surface.

In order to compensate the defects of the polycarbonate resin molded article, a method of applying a covering material composition in which an ultraviolet ray absorber is added to a curing raw material comparatively excellent in weather resistance, such as an acrylic material, a melamine-based material, a urethane-based material, and a silicon-based material, onto a front surface of a molded article, of heating the covering material composition, and of forming a coated film, or a method of irradiating the covering material composition with an active energy ray such as an ultraviolet ray or an electron ray, of curing the covering material composition, and of forming a coated film having weather resistance. Among them, a forming method of a coated film, using a curing method of an active energy ray, has advantages that productivity is excellent compared to a method using a thermal curing method.

However, in general, in a case where the wear resistance or the abrasion resistance increases, the flexibility of the coated film decreases, and thus, a coated film having poor weather resistance, is easily formed, and there are many cases where a coated film excellent in weather resistance, has low wear resistance or abrasion resistance.

In general, a composition containing silica fine particles subjected to a surface treatment with an acrylic compound, is known as a coated film imparting both of the weather resistance and the wear resistance in a trade-off relationship, to the polycarbonate resin molded article. For example, in Patent Document 1, an active energy ray curable composition containing a urethane (meth)acrylate compound, a poly (meth)acryloyl oxyalkyl isocyanurate compound, and radical polymerizable inorganic fine particles, at a specific ratio, is described.

In addition, in Patent Document 2, a composition containing surface-modified silica fine particles, a compound having one or more radical polymerizable unsaturated bonds, a siloxane compound having a (meth)acryloyl group represented by a specific formula and/or a condensate thereof, and a photopolymerization initiator, at a specific ratio, is described as a curable composition capable of forming a cured film excellent in wear resistance and weather resistance.

CITATION LIST

Patent Document

Patent Document 1: JP 2010-254840 A
Patent Document 2: WO 2015/152140 A

SUMMARY OF THE INVENTION

Problem to be Solved by the Invention

However, a cured film formed by using the composition described above is not capable of being satisfied in terms of the abrasion resistance and the weather resistance. In the outdoor environment, more improvement is required in order to prevent the degradation of the cured film and the degradation of the polycarbonate resin base material for a long period of time.

Accordingly, the invention has been made in consideration of such circumstances described above, and an object thereof is to provide an active energy ray-curable resin composition capable of forming a cured film excellent in transparency, adhesiveness with respect to a base, wear resistance, abrasion resistance, and weather resistance. In addition, another object thereof is to provide a resin molded article in which the cured film is formed.

Means for Solving Problem

According to one aspect of the invention, an active energy ray-curable resin composition, containing: a component (A): inorganic oxide particles having an organic functional group on a front surface; a component (B): a siloxane oligomer having at least one type of functional group selected from the group consisting of a (meth)acryloyl group, an epoxy group, and a vinyl group, of which a weight average molecular weight is 200 to 3000; a component (C): polyfunctional (meth)acrylate represented by Formula (1) described below; a component (D): urethane (meth)acrylate containing two or more (meth)acryloyl groups in one molecule; and a component (E): an ultraviolet ray absorber, in which with respect to 100 parts by mass of the total of the components (A), (B), (C), and (D), a content of the component (A) is 4 parts by mass to 30 parts by mass, a content of the component (B) is 2 parts by mass to 20 parts by mass, a content of the component (C) is 30 parts by mass to 80 parts by mass, and a content of the component (D) is 5 parts by mass to 50 parts by mass, and the content of the component (C) is greater than or equal to 60 parts by mass, with respect to 100 parts by mass of the total of (meth)

acrylate other than three components of the component (A), the component (B), and the component (D), is provided.

[Chemical Formula 1]

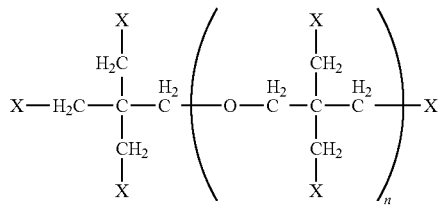

(1)

[In the formula, at least three Xs of Xs, are each independently, a modified group ($CH_2=CR-CO(OC_2H_4)_y-O-$) of a (meth)acryloyl group modified with ethylene oxide (R represents a hydrogen atom or a methyl group, and y represents an integer of greater than or equal to 1 and less than or equal to 5), a modified group ($CH_2=CR-CO(OC_3H_6)_y-O-$) of a (meth)acryloyl group modified with propylene oxide (R represents a hydrogen atom or a methyl group, and y represents an integer of greater than or equal to 1 and less than or equal to 5), a modified group ($CH_2=CR-CO(O(CH_2)_5C=O)_y-O-$) of a (meth)acryloyl group modified with caprolactone (R represents a hydrogen atom or a methyl group, and y represents an integer of greater than or equal to 1 and less than or equal to 5), or a (meth)acryloyl oxy group ($CH_2=CR-COO-$) (R represents a hydrogen atom or a methyl group), and the remaining Xs are a methyl group or a hydroxy group (—OH). In addition, n is an integer of 0 to 4.]

According to another aspect of the invention, the active energy ray-curable resin composition described above, in which a mass ratio (A/B) of the component (A) to the component (B), is in a range of 0.5 to 8, is provided.

According to another aspect of the invention, the active energy ray-curable resin composition described above, in which the component (D) is a reactant of diisocyanate having an alicyclic structure, polycarbonate polyol having a branched alkyl structure, of which a number average molecular weight is in a range of 500 to 1000, and mono (meth)acrylate having a hydroxyl group, is provided.

According to another aspect of the invention, the active energy ray-curable resin composition described above, in which the component (E) contains a hydroxyphenyl triazine-based ultraviolet ray absorber, is provided.

According to another aspect of the invention, the active energy ray-curable resin composition described above, in which the component (E) contains an ultraviolet ray absorber of which a light absorbance at a wavelength of 350 nm is greater than or equal to 1.0, is provided.

According to another aspect of the invention, the active energy ray-curable resin composition described above, further containing: a photopolymerization initiator having maximum absorption at a wavelength of 360 nm to 400 nm, as a component (F), is provided.

According to still another aspect of the invention, an active energy ray-curable resin composition, containing: inorganic oxide particles having an organic functional group on a front surface; and a (meth)acrylic monomer, in which a resin laminate obtained by laminating a cured film of the active energy ray-curable resin composition on a front surface of a transparent resin base material to have a thickness of greater than or equal to 5 μm, satisfies requisites (α), (β), and (γ) described below, is provided.

(α) In a Taber wear resistance test based on ASTM D1044 (a load 500 gf (4.90 N), and 500 rotations), a haze difference before and after a wear test is less than or equal to 15%, (β) in a steel wool abrasion resistance test based on FMVSS 108 (14 kPa, steel wool #0000, and 11 reciprocal slidings), a haze difference before and after an abrasion test is less than 1%, and (γ) a haze difference of the resin laminate before and after an accelerated weather resistance test of repeating light irradiation of a sunshine carbon arc lamp type weather resistance tester based on JIS D 0205 (an irradiation intensity: 255 W/m$^2$ at 300 nm to 700 nm, continuous irradiation, a temperature: a black panel temperature of 63° C.±3° C., and rainfall for 12 minutes in 1 hour), is performed for 5000 hours, is less than or equal to 2%.

According to still another aspect of the invention, an active energy ray-curable resin composition, containing: inorganic oxide particles having an organic functional group on a front surface; and a (meth)acrylic monomer, in which a resin laminate obtained by laminating a cured film of the active energy ray-curable resin composition on a front surface of a transparent resin base material to have a thickness of greater than or equal to 10 μm, satisfies requisites (α), (β), and (γ) described below, is provided.

(α) In a Taber wear resistance test based on ASTM D1044 (a load of 500 gf (4.90 N), and 500 rotations), a haze difference before and after a wear test is less than or equal to 15%, (β) in a steel wool abrasion resistance test based on FMVSS 108 (14 kPa, steel wool #0000, and 11 reciprocal slidings), a haze difference before and after an abrasion test is less than 1%, and (γ) a haze difference of the resin laminate before and after an accelerated weather resistance test of repeating light irradiation of a sunshine carbon arc lamp type weather resistance tester based on JIS D 0205 (an irradiation intensity: 255 W/m$^2$ at 300 nm to 700 nm, continuous irradiation, a temperature: a black panel temperature of 63° C.±3° C., and rainfall for 12 minutes in 1 hour) is performed for 7000 hours, is less than or equal to 2%.

According to still another aspect of the invention, a resin molded article in which a cured film of the active energy ray-curable resin composition described above, is formed on a front surface of a resin molding base, is provided.

According to still another aspect of the invention, the resin molded article described above, in which the resin molded article is an automotive headlamp lens, is provided.

According to still another aspect of the invention, a method of producing the resin molded article described above, including: a step of applying the active energy ray-curable resin composition onto the front surface of the resin molding base, and of irradiating the active energy ray-curable resin composition with an active energy ray, is provided.

Effect of the Invention

According to the invention, it is possible to provide an active energy ray-curable resin composition capable of forming a cured film excellent in transparency, adhesiveness with respect to a base material, wear resistance, abrasion resistance, and weather resistance, and to provide a resin molded article in which the cured film is formed.

MODE(S) FOR CARRYING OUT THE INVENTION

Hereinafter, the invention will be described by using preferred embodiments.

Furthermore, in the description of the invention, "(meth) acryl" indicates acryl and/or methacryl, "(meth)acryloyl" indicates acryloyl and/or methacryloyl, and "(meth)acrylate" indicates acrylate and/or methacrylate.

An active energy ray-curable resin composition according to the embodiment of the invention, contains inorganic oxide particles having an organic functional group on a front surface, as a component (A), a siloxane oligomer having at least one type of functional group selected from the group consisting of a (meth)acryloyl group, an epoxy group, and a vinyl group, of which a weight average molecular weight is 200 to 3000, as a component (B), polyfunctional (meth) acrylate represented by Formula (1) described above, as a component (C), urethane (meth)acrylate having two or more (meth)acryloyl groups in one molecule, as a component (D), and an ultraviolet ray absorber, as a component (E).

First, each component of a resin composition according to the embodiment of the invention will be described.

<Component (A)>

The active energy ray-curable resin composition according to the embodiment of the invention, contains the inorganic oxide particles (hereinafter, also referred to as "surface-modified particles") having the organic functional group on the front surface. The composition contains the component (A), and thus, it is possible to form a cured film excellent in wear resistance.

The inorganic oxide particles having the organic functional group on the front surface, are obtained by performing a coating treatment with respect to the front surface of the inorganic oxide particles with the organic functional group. In the invention, the inorganic oxide particles have the organic functional group on the front surface, and thus, are excellent in storage stability in a coating material, and are also excellent in compatibility with respect to a resin, and dispersibility in a coated film.

Examples of the organic functional group include an alkyl group, a glycidyl group, a (meth)acryl group, a vinyl group, a hydroxy group, an amino group, an isocyanate group, and a mercapto group, and the (meth)acryl group, the vinyl group, and the mercapto group are preferable from the viewpoint of compatibility and reactivity with respect to a resin.

In the inorganic oxide particles, it is preferable that an inorganic oxide is an oxide formed of one type of inorganic component and oxygen, or a composite oxide formed of two or more types of inorganic components and oxygen.

In addition, the inorganic component is an alkali metal of the group of 1, an alkali earth metal of the group of 2, a transition metal of the groups of 3 to 12, a typical metal of the groups of 13 to 15, and a semimetal such as boron, silicon, and germanium, and in two or more types of composite oxides, a non-metal component such as sulfur, phosphorus, and chlorine, can also be included. Examples of the inorganic component include silicon, aluminum, titanium, tin, antimony, indium, and cadmium.

In addition, an average particle diameter of primary particles of the inorganic oxide particles, is preferably less than or equal to 500 nm, is more preferably less than or equal to 100 nm, and is even more preferably less than or equal to 50 nm, from the viewpoint of the transparency of the cured film. In addition, it is preferable that the average particle diameter of the primary particles of the inorganic oxide particles is greater than or equal to 10 nm, from the viewpoint of wear resistance of the cured film. Here, the average particle diameter of the primary particles indicates an average diameter of the particles, calculated by a BET method of calculating a particle diameter from correlativity between a specific surface area and the particle diameter.

Examples of the inorganic oxide particles include colloidal silica, alumina, titanium oxide, tin oxide, hetero element-doped tin oxide (antimony-doped tin oxide (ATO) or the like), indium oxide, hetero element-doped indium oxide (tin-doped indium oxide (ITO) or the like), cadmium oxide, antimony oxide, and the like. Only one type of the inorganic oxide particles may be independently used, or two or more types thereof may be used by being combined. Among them, the colloidal silica is particularly preferable from the viewpoint of accessibility or price, and the transparency or the wear resistance of the cured film of the composition to be obtained.

The colloidal silica can be used in a state of general water dispersion, or in a state of being dispersed in an organic solvent, and in order to homogeneously disperse a silane compound containing a silane coupling agent, it is preferable to use the colloidal silica dispersed in the organic solvent.

Methanol, isopropyl alcohol, n-butanol, ethylene glycol, dimethyl acetoamide, ethylene glycol mono-n-propyl ether, propylene glycol monomethyl ether, propylene glycol monomethyl ether acetate, methyl ethyl ketone, methyl isobutyl ketone, ethyl acetate, n-butyl acetate, xylene/n-butanol, toluene, and the like can be used as the organic solvent.

For example, a commercially available product such as methanol dispersed silica sol (MA-ST and MA-ST-M), isopropyl alcohol dispersed silica sol (IPA-ST, IPA-ST-L, IPA-ST-ZL, and IPA-ST-UP), ethylene glycol dispersed silica sol (EG-ST and EG-ST-L), dimethyl acetoamide dispersed silica sol (DMAC-ST and DMAC-ST-L), xylene/butanol dispersed silica sol (XBA-ST), methyl ethyl ketone dispersed silica sol (MEK-ST, MEK-ST-L, MEK-ST-ZL, and MEK-ST-UP), methyl isobutyl ketone dispersed silica sol (MIBK-ST), propylene glycol monomethyl ether acetate dispersed silica sol (PMA-ST), (in the parentheses, the names of the products manufactured by Nissan Chemical Industries Ltd.), can be used as the colloidal silica in a state of being dispersed in the organic solvent.

Commercially available particles may be used as the surface-modified particles, or particles produced by performing a coating treatment with respect to the front surface of the inorganic oxide particles with the organic functional group, may be used. In addition, the surface-modified particles obtained by performing the coating treatment with respect to the inorganic oxide particles having the organic functional group on the front surface, with the organic functional group, can be used.

Examples of a method of performing the coating treatment with respect to the front surface of the inorganic oxide particles with the organic functional group include a method in which a silane compound containing a silane coupling agent is added and mixed to an inorganic oxide particles dispersed in a solvent, pure water is added to the mixture, and thus, a hydrolysis reaction and a dehydration condensation reaction are performed, a method in which a compound having an isocyanate group is added to inorganic oxide particles dispersed in an organic solvent not having a hydroxyl group, and a heating treatment is performed in the presence of a catalyst, and the like. Furthermore, in order to adjust a solid content concentration of a dispersion liquid of the surface-modified particles by an evaporation operation, it is preferable that a boiling point of organic solvent used for the dispersion, is lower than or equal to 150° C.

Specific examples of the silane compound used for the coating treatment of the inorganic oxide particles, include a silane compound having an alkyl group, such as ethyl trimethoxysilane, ethyl triethoxysilane, diethyl diethoxysilane, triethyl ethoxysilane, propyl trimethoxysilane, isobutyl trimethoxysilane, n-pentyl triethoxysilane, n-hexyl trimethoxysilane, n-hexyl triethoxysilane, n-heptyl trimethoxysilane, and hexamethyl disilane; a silane compound having a (meth)acryl group, such as 2-(meth)acryloyl oxyethyl trimethoxysilane, 2-(meth)acryloyl oxyethyl triethoxysilane, 2-(meth)acryloyl oxyethyl trihydroxysilane, 3-(meth)acryloyl oxypropyl trimethoxysilane, 3-(meth) acryloyl oxypropyl triethoxysilane, 3-(meth)acryloyl oxypropyl trihydroxysilane, 4-(meth)acryloyl oxybutyl trimethoxysilane, 4-(meth)acryloyl oxybutyl triethoxysilane, and 4-(meth)acryloyl oxybutyl trihydroxysilane; a silane compound having a glycidyl group, such as 2-(3,4-epoxycyclohexyl)ethyl trimethoxysilane, 3-glycidoxypropyl trimethoxysilane, and 3-glycidoxypropyl methyl diethoxysilane; a silane compound having a vinyl group, such as vinyl trimethoxysilane and vinyl triethoxysilane, and the like.

Among them, preferred examples of the silane compound include 3-acryloyl oxypropyl trimethoxysilane, 3-acryloyl oxypropyl triethoxysilane, 3-methacryloyl oxypropyl trimethoxysilane, 3-methacryloyl oxypropyl triethoxysilane, from the viewpoint of the accessibility.

A content rate of the component (A) in active energy ray-curable resin composition, is preferably greater than or equal to 4 parts by mass, is more preferably greater than or equal to 5 parts by mass, is even more preferably greater than or equal to 6 parts by mass, and is particularly preferably greater than or equal to 7 parts by mass, with respect to 100 parts by mass of the total of the component (A), the component (B), the component (C), and the component (D), from the viewpoint of improving the wear resistance of the cured film. In addition, the content rate of the component (A) is preferably less than or equal to 30 parts by mass, is more preferably less than or equal to 25 parts by mass, and is even more preferably less than or equal to 20 parts by mass, from the viewpoint of the weather resistance and heat resistance (crack resistance) of the cured film.

<Component (B)>

The component (B) is a siloxane oligomer having at least one type of functional group selected from the group consisting of a (meth)acryloyl group, an epoxy group, and a vinyl group.

It is preferable that the siloxane oligomer is a condensate of silane compounds of a silane compound A represented by General Formula (2) described below and a silane compound B represented by General Formula (3) described below.

Silane Compound A:

$(R^1)_n(R^2)_m Si(OR^3)_{4-n-m}$ (2)

(In the formula, $R^1$ is a group having any one of a (meth)acryloyl group, an epoxy group, and a vinyl group, and when there are a plurality of $R^1$s, the plurality of $R^1$s may be identical to each other or different from each other. $R^2$ represents an organic group having 1 to 12 carbon atoms, and when there are a plurality of $R^2$s, the plurality of $R^2$s may be identical to each other or different from each other. $R^3$ represents an alkyl group having 1 to 5 carbon atoms or an acyl group having 1 to 6 carbon atoms, and when there are a plurality of $R^3$s, the plurality of $R^3$s may be identical to each other or different from each other. n is an integer of 1 to 3, m is an integer of 0 to 2, and n+m is an integer of 1 to 3.)

Silane Compound B:

$(R^2)_n Si(OR^3)_{4-n}$ (3)

(In the formula, $R^2$ represents an organic group having 1 to 12 carbon atoms, and when there are a plurality of $R^2$s, the plurality of $R^2$s are identical to each other or different from each other, and $R^3$ represents an alkyl group having 1 to 5 carbon atoms or an acyl group having 1 to 6 carbon atoms, and when there are a plurality of $R^3$s, the plurality of $R^3$s are identical to each other or different from each other, and n is an integer of 1 to 3.)

The condensate of the silane compounds can be used as a hydrolysate by using only one type of the condensates or a combination of arbitrary two or more types thereof, but a siloxane oligomer formed only of the silane compound B represented by General Formula (3), is not contained in the component.

Here, in a case where the condensate of the silane compounds is used as the hydrolysate, it is not necessary that all of 1 to 3 $OR^3$ groups included in the silane compound are hydrolyzed, and for example, only one $OR^3$ group is hydrolyzed, two or more $OR^3$ groups are hydrolyzed, or a mixture thereof may be included.

In the condensate of the silane compounds, a silanol group in a hydrolysate generated by hydrolyzing a silane compound, is condensed by dehydration or a dealcoholization reaction, and thus, an Si—O—Si bond is formed. In the active energy ray-curable resin composition according to the embodiment of the invention, it is not necessary that all of the silanol groups are condensed, and in the condensate, a part of the silanol groups is condensed, a mixture thereof, or the like, is included.

In General Formula (2), the organic group of $R^1$ may have at least one type of functional group selected from the group consisting of a (meth)acryloyl group, an epoxy group, and a vinyl group, and may have a functional group such as an allyl group or a glycidyl group, and a substituted derivative thereof.

In General Formula (2), when there are the plurality of $R^1$s, the plurality of $R^1$s may be identical to each other or different from each other.

In addition, examples of the alkyl group having 1 to 5 carbon atoms of $R^3$, are capable of including a methyl group, an ethyl group, an n-propyl group, an i-propyl group, an n-butyl group, a sec-butyl group, a t-butyl group, an n-pentyl group, and the like, and examples of the acyl group having 1 to 6 carbon atoms of $R^3$, are capable of including an acetyl group, a propionyl group, a butyryl group, a valeryl group, a caproyl group, and the like.

In General Formula (2), where there are the plurality of $R^3$s, the plurality of $R^3$s may be identical to each other or different from each other.

In General Formulas (2) and (3), examples of a monovalent organic group having 1 to 12 carbon atoms of $R^2$, are capable of including an alkyl group such as a methyl group, an ethyl group, an n-propyl group, an i-propyl group, an n-butyl group, an i-butyl group, a sec-butyl group, a t-butyl group, an n-hexyl group, a cyclohexyl group, an n-heptyl group, an n-octyl group, a 2-ethyl hexyl group, an n-decyl group, and an n-dodecyl group; an acyl group such as an acetyl group, a propionyl group, a butyryl group, a valeryl group, a benzoyl group, a toluoyl group, and a caproyl group; a phenyl group, an ureido group, an amide group, a fluoroacetoamide group, an isocyanate group, and a substituted derivative thereof, and the like.

Examples of a substituted group of the substituted derivative of $R^2$, are capable of including a halogen atom, a substituted or non-substituted amino group, a hydroxyl group, a mercapto group, an isocyanate group, an ureido group, an ammonium salt group, and the like. Here, the number of carbon atoms of $R^3$ formed of the substituted derivative, is less than or equal to 12 including carbon atoms in the substituted group.

In General Formula (2) or (3), when there are the plurality of $R^2$s, the plurality of $R^2$s may be identical to each other or different from each other.

Specific examples of the silane compound A include a silane coupling agent having a (meth)acryloyl group, such as 2-(meth)acryloyl oxyethyl trimethoxysilane, 2-(meth)acryloyl oxyethyl triethoxysilane, 2-(meth)acryloyl oxyethyl methyl dimethoxysilane, 2-(meth)acryloyl oxyethyl methyl diethoxysilane, 3-(meth)acryloyl oxypropyl trimethoxysilane, 3-(meth)acryloyl oxypropyl triethoxysilane, 3-(meth) acryloyl oxypropyl methyl dimethoxysilane, 3-(meth)acryloyl oxypropyl methyl diethoxysilane, 4-(meth)acryloyl oxybutyl trimethoxysilane, 4-(meth)acryloyl oxybutyl triethoxysilane, 4-(meth)acryloyl oxybutyl methyl dimethoxysilane, and 4-(meth)acryloyl oxybutyl methyl diethoxysilane; a silane coupling agent having an epoxycycloalkyl group, such as 2-(3,4-epoxycyclohexyl)ethyl trimethoxysilane and 2-(3,4-epoxycyclohexyl)ethyl methyl dimethoxysilane; a silane coupling agent having a glycidyl group, such as 3-glycidoxypropyl trimethoxysilane and 3-glycidoxypropyl methyl diethoxysilane; a silane coupling agent having a vinyl group, such as vinyl trimethoxysilane and vinyl triethoxysilane, and the like.

In addition, examples of the alkyl group having 1 to 5 carbon atoms of $R^3$ in General Formula (3), are capable of including a methyl group, an ethyl group, an n-propyl group, an i-propyl group, an n-butyl group, a sec-butyl group, a t-butyl group, an n-pentyl group, and the like, and examples of the acyl group having 1 to 6 carbon atoms, are capable of including an acetyl group, a propionyl group, a butyryl group, a valeryl group, a caproyl group, and the like.

In General Formula (3), when there are the plurality of $R^3$s, the plurality of $R^3$s may be identical to each other or different from each other.

As an example of the silane compound represented by General Formula (3), examples of a silane compound substituted with one non-hydrolyzable group and three hydrolyzable groups, include trialkoxysilane such as methyl trimethoxysilane, methyl triethoxysilane, ethyl trimethoxysilane, ethyl triethoxysilane, n-propyl trimethoxysilane, n-propyl triethoxysilane, i-propyl trimethoxysilane, i-propyl triethoxysilane, n-butyl trimethoxysilane, n-butyl triethoxysilane, n-pentyl trimethoxysilane, n-hexyl trimethoxysilane, n-heptyl trimethoxysilane, n-octyl trimethoxysilane, 2-ethyl hexyl trimethoxysilane, n-decyl trimethoxysilane, n-dodecyl trimethoxysilane, vinyl trimethoxysilane, vinyl triethoxysilane, cyclohexyl trimethoxysilane, cyclohexyl triethoxysilane, phenyl trimethoxysilane, phenyl triethoxysilane, 3-chloropropyl trimethoxysilane, 3-chloropropyl triethoxysilane, 3,3,3-trifluoropropyl trimethoxysilane, 3,3,3-trifluoropropyl triethoxysilane, 3-aminopropyl trimethoxysilane, 3-aminopropyl triethoxysilane, 2-hydroxyethyl trimethoxysilane, 2-hydroxyethyl triethoxysilane, 2-hydroxypropyl trimethoxysilane, 2-hydroxypropyl triethoxysilane, 3-hydroxypropyl trimethoxysilane, 3-hydroxypropyl triethoxysilane, 3-mercapto propyl trimethoxysilane, 3-mercapto propyl triethoxysilane, 3-isocyanate propyl trimethoxysilane, 3-isocyanate propyl triethoxysilane, 3-ureido propyl trimethoxysilane, 3-ureido propyl triethoxysilane, and methyl triacetyl oxysilane.

In addition, as an example of the silane compound represented by General Formula (3), examples of a silane compound substituted with two non-hydrolyzable groups and two hydrolyzable groups, include dialkoxysilane such as dimethyl dimethoxysilane, dimethyl diethoxysilane, diethyl dimethoxysilane, diethyl diethoxysilane, di-n-propyl dimethoxysilane, di-n-propyl diethoxysilane, di-i-propyl dimethoxysilane, di-i-propyl diethoxysilane, di-n-butyl dimethoxysilane, di-n-butyl diethoxysilane, di-n-pentyl dimethoxysilane, di-n-pentyl diethoxysilane, di-n-hexyl dimethoxysilane, di-n-hexyl diethoxysilane, di-n-heptyl dimethoxysilane, di-n-heptyl diethoxysilane, di-n-octyl dimethoxysilane, di-n-octyl diethoxysilane, di-n-decyl dimethoxysilane, di-n-dodecyl dimethoxysilane, di-n-cyclohexyl dimethoxysilane, di-n-cyclohexyl diethoxysilane, diphenyl dimethoxysilane, and diphenyl diethoxysilane, dimethyl diacetyl oxysilane, and the like.

In addition, as an example of the silane compound represented by General Formula (3), examples of a silane compound substituted with three non-hydrolyzable groups and one hydrolyzable group, are capable of including tributyl methoxysilane, trimethyl methoxysilane, trimethyl ethoxysilane, tributyl ethoxysilane, triphenyl methoxysilane, triphenyl ethoxysilane, and the like.

In the active energy ray-curable resin composition according to the embodiment of the invention, a hydrolysis condensate independently using only one type of the silane compounds A represented by Formula (2) described above, may be used as the siloxane oligomer (the component (B)), a hydrolysis condensate using two or more types of the silane compounds A together, or a hydrolysis condensate using one or more types of the silane compounds A and one or more types of the silane compounds B represented by Formula (3) described above together, may be used.

In the invention active energy ray-curable resin composition according to the embodiment of the present, commercially available polysiloxane may be used as it is, as the siloxane oligomer (the component (B)), and the condensate of the silane compound A and the silane compound B can be used by being hydrolyzed. In this case, a product produced by hydrolyzing and condensing the silane compound in advance, may be used, and the siloxane oligomer formed of the silane compound at the time of preparing the component (A), may be used as it is.

In the siloxane oligomer configuring the component (B), a weight average molecular weight (hereinafter, referred to as "Mw") is preferably in a range of 200 to 3,000, is more preferably in a range of 300 to 2,500, and is even more preferably in a range of 500 to 2,000, from the viewpoint of compatibility with a resin composition.

Furthermore, in the invention, the weight average molecular weight (Mw) was measured by a gel permeation chromatography method (a GPC method). As a measurement sample, a tetrahydrofuran solution of a siloxane oligomer (a concentration: 0.3 mass %) was prepared. A device provided with a column manufactured by Tosoh Corporation (TSKgel Super HM-H*4, TSKguardcolumn SuperH-H), was used as a measurement device. A measurement condition was as follows. An injected amount of a measurement sample (the solution described above): 20 μl, a flow rate: 0.6 ml/minute, an eluent: tetrahydrofuran (a stabilizer BHT: 2,6-di-tert-butyl-p-cresol), and a column temperature: 40° C. From the obtained measurement result, the weight average molecular weight (Mw) was calculated in terms of standard polystyrene.

A content rate of the component (B) in the active energy ray-curable resin composition, is preferably greater than or equal to 2 parts by mass, is more preferably greater than or equal to 3 parts by mass, is even more preferably greater than or equal to 4 parts by mass, and is particularly preferably greater than or equal to 5 parts by mass, with respect to 100 parts by mass of the total of the component (A), the component (B), the component (C), and the component (D), from the viewpoint of improving the dispersibility of the component (A) in the cured film, and of improving the abrasion resistance and the weather resistance of the cured film. In addition, the content rate of the component (B) is preferably less than or equal to 20 parts by mass, is more preferably less than or equal to 18 parts by mass, and is even more preferably less than or equal to 16 parts by mass. Furthermore, it is not easy to completely remove the hydrolysate of the condensate of the silane compounds, not used for covering the inorganic oxide particles, at the time of synthesizing the component (A), and thus, in a preparation stage of the component (A), it is preferable that a synthesis formulation is performed with respect to the inorganic oxide particles such that a silane coupling agent or a compound having an isocyanate group is adjusted to an excessive amount, in order to suppress the generation of the hydrolysate of the condensate of the silane compounds.

In addition, a mass ratio (A/B) of the component (A) to the component (B) in the active energy ray-curable resin composition, is preferably in a range of 0.5 to 8, is more preferably in a range of 0.9 to 6, is even more preferably in a range of 1 to 5, and is particularly preferably in a range of 1 to 3, from the viewpoint of improving the dispersibility with respect to the component (A) in the cured film, and of improving the abrasion resistance of the cured film.

(Method of Producing Component (B))

A condition for hydrolyzing and condensing the silane compound, is not particularly limited insofar as at least a part of the silane compound is hydrolyzed, and the hydrolyzable group is converted into a silanol group, or a condensation reaction is caused, and as an example, the hydrolysis and the condensation can be performed as follows.

It is preferable to use water purified by a method such as a reverse osmosis membrane treatment, an ion exchange treatment, and distillation, as water used for the hydrolysis of the silane compounds represented by Formula (2) or (3) described above. By using such purified water, it is possible to suppress a side reaction, and to improve hydrolysis reactivity.

A used amount of water is preferably 0.1 moles to 3 moles, is more preferably 0.3 moles to 2 moles, and is even more preferably 0.3 moles to 1.8 moles, with respect to 1 mole of the total amount of the hydrolyzable group ($-OR^2$) of the silane compound. By using such an amount of water, it is possible to adjust a reaction speed of the hydrolysis to a desired range, and to optimize a reaction condition.

A solvent capable of being used for the hydrolysis reaction and the condensation reaction of the silane compound, is not particularly limited. Preferred examples of such a solvent include propyl alcohol, butyl alcohol, methyl ethyl ketone, methyl isobutyl ketone, ethylene glycol monoalkyl ether, ethylene glycol monoalkyl ether acetate, diethylene glycol dialkyl ether, propylene glycol monoalkyl ether, propylene glycol monoalkyl ether acetate, propionate ester, and the like. Among such solvents, the propyl alcohol, the methyl isobutyl ketone, the diethylene glycol dimethyl ether, the diethylene glycol ethyl methyl ether, the propylene glycol monomethyl ether, the propylene glycol monoethyl ether, the propylene glycol monomethyl ether acetate, and the 3-methoxypropionate methyl are preferable. Only one type of the solvents can be independently used, or two or more types thereof can be used by being combined.

A catalyst capable of being used for the hydrolysis reaction and the condensation reaction of the silane compound, is not particularly limited. Preferred examples of such a catalyst, include an acid catalyst (for example, a hydrochloric acid, a sulfuric acid, a nitric acid, a formic acid, an oxalic acid, an acetic acid, a trifluoroacetic acid, a trifluoromethane sulfonic acid, a phosphoric acid, an acidic ion exchange resin, and various Lewis acids), a base catalyst (for example, a nitrogen-containing compound such as ammonia, primary amine, secondary amine, tertiary amine, and pyridine; a basic ion exchange resin; a hydroxide such as sodium hydroxide; a carbonate such as potassium carbonate; a carboxylate such as sodium acetate; and various Lewis bases), or alkoxide (for example, zirconium alkoxide, titanium alkoxide, and aluminum alkoxide), and the like. For example, tetra-i-propoxyaluminum can be used as the aluminum alkoxide. A used amount of the catalyst can be preferably set to be less than or equal to 0.2 moles, and is more preferably 0.00001 moles to 0.1 moles, with respect to 1 mole of a monomer of the silane compound, from the viewpoint of accelerating a hydrolysis reaction.

A reaction temperature and a reaction time in the hydrolysis and the condensation of the silane compound, can be suitably set, and for example, the following condition can be adopted. The reaction temperature is preferably 40° C. to 200° C., and is more preferably 50° C. to 150° C. The reaction time is preferably 30 minutes to 24 hours, and is more preferably 1 hour to 12 hours. By setting the reaction temperature and the reaction time as described above, it is possible to most efficiently perform the hydrolysis reaction. In the hydrolysis and the condensation, the silane compound, water, and the catalyst may be added into a reaction system at once, and a reaction may be performed in one step, or the silane compound, water, and the catalyst may be added into the reaction system in a plurality of times, and thus, the hydrolysis reaction and the condensation reaction may be performed in a plurality of stages. Furthermore, a dehydration agent is added after the hydrolysis reaction and the condensation reaction, and as necessary, evaporation is performed, and thus, water and generated alcohol can be removed from the reaction system.

<Component (C)>

The active energy ray-curable resin composition according to the embodiment of the invention, contains polyfunctional (meth)acrylate (the component (C)) represented by Formula (1) described above, as one of radical polymerizable compounds.

By containing the component (C), it is possible for the resin composition to exhibit more excellent polymerization activity according to the irradiation of an active energy ray, and it is possible to form a polymer having an advanced crosslinking density, which is excellent in the abrasion resistance. Therefore, it is possible to form the cured film excellent in the abrasion resistance, on a front surface of a base material.

Specific examples of the component (C) represented by Formula (1) described above, include trimethylol propane tri(meth)acrylate, EO-modified trimethylol propane tri(meth)acrylate, PO-modified trimethylol propane tri(meth) acrylate, caprolactone-modified trimethylol propane tri (meth)acrylate, pentaerythritol tri(meth)acrylate, EO-modified pentaerythritol tri(meth)acrylate, PO-modified pentaerythritol tri(meth)acrylate, caprolactone-modified pentaerythritol tri(meth)acrylate, pentaerythritol tetra(meth)acrylate, EO-modified pentaerythritol tetra(meth)acrylate, PO-modified pentaerythritol tetra(meth)acrylate, caprolactone-modified pentaerythritol tetra(meth)acrylate, dipentaerythritol penta(meth)acrylate, EO-modified dipentaerythritol penta(meth)acrylate, PO-modified dipentaerythritol penta(meth)acrylate, caprolactone-modified dipentaerythritol penta(meth)acrylate, dipentaerythritol hexa(meth)acrylate, EO-modified dipentaerythritol hexa(meth)acrylate, PO-modified dipentaerythritol hexa(meth)acrylate, caprolactone-modified dipentaerythritol hexa(meth)acrylate, and the like. Furthermore, "EO" indicates ethylene oxide, and "PO" indicates propylene oxide.

y of X in Formula (1) described above, is preferably less than or equal to 5, is more preferably less than or equal to 3, and is even more preferably less than or equal to 2, from the viewpoint of the abrasion resistance, the weather resistance (yellowing resistance and the crack resistance), reactivity with respect to an active energy ray, and affinity with respect to the inorganic oxide particles, in the obtained cured film.

A content rate of the component (C) in the active energy ray-curable resin composition according to the embodiment of the invention, is preferably greater than or equal to 30 parts by mass, is more preferably greater than or equal to 40 parts by mass, is even more preferably greater than or equal to 50 parts by mass, and is particularly preferably greater than or equal to 55 parts by mass, with respect to 100 parts by mass of the total of the component (A), the component (B), the component (C), and the component (D), from the viewpoint of improving the abrasion resistance and the weather resistance of the cured film. In addition, the content rate of the component (C) is preferably less than or equal to 80 parts by mass, is more preferably less than or equal to 75 parts by mass, and is even more preferably less than or equal to 70 parts by mass, from the viewpoint of improving the weather resistance (the crack resistance) and the heat resistance of the cured film.

In addition, the content rate of the component (C) in the active energy ray-curable resin composition according to the embodiment of the invention, is preferably greater than or equal to 60 parts by mass, is more preferably greater than or equal to 70 parts by mass, and is even more preferably greater than or equal to 75 parts by mass, with respect to 100 parts by mass of the total of (meth)acrylate other than three components of the component (A), the component (B), and the component (D), from the viewpoint of improving the abrasion resistance and the weather resistance of the cured film. In addition, the content rate of the component (C) is preferably less than or equal to 100 parts by mass, is more preferably less than or equal to 90 parts by mass, and is even more preferably less than or equal to 85 parts by mass, from the viewpoint of improving the adhesiveness, the weather resistance (the crack resistance), and the heat resistance of the cured film.

Furthermore, the (meth)acrylate other than three components of the component (A), the component (B), and the component (D), is not particularly limited insofar as being (meth)acrylate of improving a surface hardness of the cured film or the adhesiveness with respect to the base material, and a compound having two or more (meth)acryloyl groups but not an aromatic group, is preferable from the viewpoint that the coated film is not colored in the outdoor use. Examples of the compound include di(meth)acrylate, tri- or higher polyfunctional (meth)acrylate, and the like.

Examples of the di(meth)acrylate include 1,4-butanediol di(meth)acrylate, 1,6-hexanediol di(meth)acrylate, 1,9-nonanediol di(meth)acrylate, neopentyl glycol di(meth)acrylate, ethylene glycol di(meth)acrylate, polyethylene glycol (repeating unit n=2 to 15) di(meth)acrylate, polypropylene glycol (repeating unit n=2 to 15) di(meth)acrylate, polybutylene glycol (repeating unit n=2 to 15) di(meth)acrylate, 2,2-bis(4-(meth)acryloyl oxyethoxyphenyl) propane, 2,2-bis(4-(meth)acryloyl oxydiethoxyphenyl) propane, trimethylol propane di(meth)acrylate, tricyclodecane dimethanol diacrylate, bis(2-acryloyl oxyethyl) hydroxyethyl isocyanurate, bis(2-acryloyl oxypropyl) hydroxyethyl isocyanurate, and the like.

Examples of the tri- or higher polyfunctional (meth)acrylate include trimethylol propane tri(meth)acrylate, trimethylol propane tri(meth)acrylate modified with caprolactone, tris(2-acryloyl oxyethyl) isocyanurate, tris(2-acryloyl oxypropyl) isocyanurate, and the like.

<Component (D)>

The active energy ray-curable resin composition according to the embodiment of the invention contains the component (D), as one of the radical polymerizable compounds, that is, contains a urethane (meth)acrylate compound having two or more (meth)acryloyl groups in one molecule. By using the component (D), it is possible to impart toughness to the cured film of the resin composition, and to improve the adhesiveness and the weather resistance of the cured film.

It is preferable that the component (D) is urethane (meth)acrylate having two or more urethane bonds and two or more (meth)acryloyl oxy groups in one molecule. A direct addition type urethane (meth)acrylate compound obtained by allowing hydroxy(meth)acrylate (D1) having a hydroxy group and a (meth)acryloyl oxy group, to react with polyisocyanate (D2), and/or a polyurethane (meth)acrylate compound obtained by allowing the hydroxy(meth)acrylate (D1) having a hydroxy group and a (meth)acryloyl oxy group, to react with the polyisocyanate (D2), and a polyol compound (D3) having two or more hydroxyl groups in one molecule, are preferable as the urethane (meth)acrylate (D).

(Hydroxy(Meth)Acrylate (D1))

The hydroxy(meth)acrylate (D1) is not particularly limited insofar as being hydroxy(meth)acrylate having a hydroxy group and a (meth)acryloyl oxy group, and examples of the hydroxy(meth)acrylate (D1) include 2-hydroxyethyl acrylate (HEA), 2-hydroxyethyl methacrylate (HEMA), 2-hydroxypropyl acrylate (HPA), 2-hydroxypropyl methacrylate (HPMA), 2-hydroxybutyl acrylate (HBA), 2-hydroxybutyl methacrylate (HBMA), an adduct of 1 mol-caprolactone of HEA (Placcel FA1), an adduct of 2 mol-caprolactone of HEA (Placcel FA2D), an adduct of 5 mol-caprolactone of HEA (Placcel FA5), an adduct of 10 mol-caprolactone of HEA (Placcel FA10L), a compound having a skeleton of mono- or polypentaerythritol, and the like, and only one type of the hydroxy(meth)acrylates may be independently used, or two or more types thereof may be used together.

Furthermore, specific examples of the compound having a skeleton of mono- or polypentaerythritol, include pentaerythritol tri(meth)acrylate, dipentaerythritol tri(meth)acrylate, dipentaerythritol tetra(meth)acrylate, dipentaerythritol penta(meth)acrylate, and the like.

Among them, the 2-hydroxyethyl acrylate, the 2-hydroxypropyl acrylate, the 2-hydroxybutyl acrylate, the adduct of 1 mol-caprolactone of HEA (a product name: Placcel FA1, manufactured by Daicel Corporation), the adduct of 2 mol-caprolactone of HEA (a product name: Placcel FA2D, manufactured by Daicel Corporation), the pentaerythritol triacrylate, and the like can be preferably used, from the viewpoint of the accessibility, the reactivity, the compatibility, and the like.

(Polyisocyanate (D2))

The polyisocyanate (D2) is not particularly limited insofar as being polyisocyanate having two or more isocyanate groups in one molecule, and examples of the polyisocyanate (D2) include aliphatic polyisocyanate such as hexamethylene diisocyanate (HDI), trimethyl hexamethylene diisocyanate (TMHDI), and lysine diisocyanate; alicyclic polyisocyanate such as norbornane diisocyanate (NBDI), transcyclohexane-1,4-diisocyanate, isophorone diisocyanate (IPDI), bis(isocyanate methyl) cyclohexane (hydrogenated XDI), and dicyclohexyl methane diisocyanate (hydrogenated MDI); aromatic polyisocyanate such as TDI (for example, 2,4-tolylene diisocyanate (2,4-TDI) and 2,6-tolylene diisocyanate (2,6-TDI)), MDI (for example, 4,4'-diphenyl methane diisocyanate (4,4'-MDI) and 2,4'-diphenyl methane diisocyanate (2,4'-MDI)), 1,4-phenylene diisocyanate, polymethylene polyphenylene polyisocyanate, xylene diisocyanate (XDI), tetramethyl xylene diisocyanate (TMXDI), tolidine diisocyanate (TODI), 1,5-naphthalene diisocyanate (NDI), and triphenyl methane triisocyanate; isocyanurates, adducts, and biurets thereof; and the like, and only one type of the polyisocyanates may be independently used, or two or more types thereof may be used together.

Among them, the aliphatic polyisocyanate and the alicyclic polyisocyanate are preferable from the reason of more excellent weather resistance, and the hexamethylene diisocyanate (HDI), the isophorone diisocyanate (IPDI), the bis(isocyanate methyl) cyclohexane (the hydrogenated XDI), the dicyclohexyl methane diisocyanate (the hydrogenated MDI), isocyanurates of the hexamethylene diisocyanate (a product name: DURANATE TPA-100, manufactured by Asahi Kasei Corporation), adducts of the hexamethylene diisocyanate (a product name: DURANATE P301-75E, manufactured by Asahi Kasei Corporation), and biurets of the hexamethylene diisocyanate (a product name: DURANATE 24A-100, manufactured by Asahi Kasei Corporation) are more preferable.

(Polyol (D3) Having Two Hydroxyl Groups in One Molecule)

The polyol (D3) is not particularly limited insofar as being a polyol having two hydroxyl groups in one molecule, and examples of the polyol (D3) include ethylene glycol, propylene glycol, diethylene glycol, butylene glycol, neopentyl glycol, 1,6-hexanediol, 3-methyl-1,5-pentanediol, 3,3'-dimethylol heptane, polyoxyethylene glycol, polyoxypropylene glycol, polytetramethylene ether glycol (PTMG), polycarbonate diol, lactone-based diol, and the like, and only one type of the polyols may be independently used, or two or more types thereof may be used together.

For example, a reactant between pentaerythritol triacrylate and isophorone diisocyanate; a reactant between Placcel FA-1 and DURANATE TPA-100; a reactant between Placcel FA-2D and DURANATE 24A-100; and the like can be preferably used as the direct addition type urethane (meth) acrylate obtained by allowing the hydroxy(meth)acrylate (D1) to react with the polyisocyanate (D2).

In addition, for example, a polycarbonate polyol compound, a diisocyanate compound having an alicyclic structure, a urethane (meth)acrylate compound synthesized from a mono(meth)acrylate compound having a hydroxyl group, and the like can be preferably used as the urethane (meth) acrylate obtained by allowing the hydroxy(meth)acrylate (D1) to react with the polyisocyanate (D2) and the polyol (D3).

It is preferable that the polycarbonate polyol compound which is the component (D3), has a branched alkyl structure. Accordingly, the viscosity of the polycarbonate polyol compound at the time of being a coating material is suppressed, and thus, smoothness after spray coating can be retained, and the flexibility of the cured film of the active energy ray-curable resin composition is improved. It is preferable that a number average molecular weight of the polycarbonate polyol compound is in a range of 500 to 1000. By setting the number average molecular weight to be greater than or equal to 500, the weather resistance of the cured film of the active energy ray-curable resin composition is improved. In addition, by setting the number average molecular weight to be less than or equal to 1000, the abrasion resistance of the cured film is improved. Furthermore, the number average molecular weight is calculated from a hydroxyl value and the number of hydroxyl groups in one molecule.

Such a polycarbonate polyol compound, for example, can be synthesized by an ester exchange reaction between polyvalent alcohol having a branched alkyl structure and carbonate ester. Specific examples of the polyvalent alcohol having a branched alkyl structure, include 3-methyl-1,5-pentanediol, neopentyl glycol, 2-ethyl-1,3-hexanediol, 2-methyl-1,8-octanediol, and the like. Specific examples of the carbonate ester, include ethylene carbonate, dimethyl carbonate, diethyl carbonate, di-n-propyl carbonate, diisopropyl carbonate, dibutyl carbonate, dicyclohexyl carbonate, diphenyl carbonate, and the like.

A commercially available product can also be used as the polycarbonate polyol compound. Specifically, examples of the commercially available product of the polycarbonate polyol compound having a branched alkyl structure, of which the number average molecular weight is in a range of 500 to 1000, include a product name: Kuraray Polyol C-590, Kuraray Polyol C-770, Kuraray Polyol C-1050, Kuraray Polyol C-1090, Kuraray Polyol C1065N, Kuraray Polyol C-1015N, and the like, manufactured by Kuraray Co., Ltd.

(Method of Producing Component (D))

Examples of a method of producing the component (D) in the active energy ray-curable resin composition according to the embodiment of the invention, include a method in which two or three types of raw materials described above are used such that the amount of isocyanate group is approximately identical to the amount of hydroxyl group, and react with each other by being heated at 60° C. to 70° C. for several hours in the presence of a tin-based catalyst such as di-n-butyl tin dilaurate. A reactant generally has high viscosity, and thus, it is preferable that the reactant is diluted with an organic solvent or other diluted monomers, during the reaction or after the reaction is ended.

A content rate of the component (D) in the active energy ray-curable composition according to the embodiment of the invention, is preferably 5 parts by mass, is more preferably 10 parts by mass, and is even more preferably 15 parts by mass, with respect to 100 parts by mass of the total of the component (A), the component (B), the component (C), and the component (D), from the viewpoint of improving the weather resistance (the crack resistance) and the heat resistance of the cured film. In addition, the content rate of the component (D) is preferably less than or equal to 50 parts by mass, is more preferably less than or equal to 40 parts by mass, is even more preferably less than or equal to 35 parts by mass, and is particularly preferably less than or equal to 30 parts by mass, from the viewpoint of improving the abrasion resistance of the cured film.

<Component (E)>

The active energy ray-curable resin composition according to the embodiment of the invention, contains the component (E), that is, an ultraviolet ray absorber. By using the component (E), it is possible to impart an effect of absorbing an ultraviolet ray included in solar light, to the cured film of the resin composition, and to improve the weather resistance of the base material.

The component (E) is not particularly limited insofar as being capable of absorbing an ultraviolet ray, and a component which is capable of being homogeneously dissolved in the active energy ray-curable resin composition according to the embodiment of the invention, and has high ultraviolet ray absorption power, is preferable. An ultraviolet ray absorber which is a compound induced from benzophenone, benzotriazole, hydroxyphenyl triazine, phenyl salicylate, and phenyl benzoate, and has a maximum absorption wavelength in a range of 240 to 380 nm, is preferable from the viewpoint of excellent solubility with respect to the active energy ray-curable resin composition according to the embodiment of the invention, and an effect of improving the weather resistance of the base material. In particular, a benzophenone-based or hydroxyphenyl triazine-based ultraviolet ray absorber is preferable from the viewpoint of being contained in the active energy ray-curable resin composition in large amounts, and a benzotriazole-based or hydroxyphenyl triazine-based ultraviolet ray absorber is preferable from the viewpoint of preventing the base material such as a polycarbonate resin, from being yellowed. Further, the hydroxyphenyl triazine-based ultraviolet ray absorber is more preferable from the viewpoint that it is difficult to bleed out from the coated film.

Specific examples of the ultraviolet ray absorber, include a benzophenone-based ultraviolet ray absorber such as 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydroxybenzophenone, 2-hydroxy-4-octadecyl oxybenzophenone, 2,2'-dihydroxy-4-methoxybenzophenone, and 2,2'-dihydroxy-4,4'-dimethoxybenzophenone; a benzotriazole-based ultraviolet ray absorber such as 2-(2-hydroxy-5-methyl phenyl) benzotriazole, 2-(2-hydroxy-5-tert-butyl phenyl) benzotriazole, 2-(2-hydroxy-3,5-di-tert-butyl phenyl)-5-chlorobenzotriazole, 2-(2-hydroxy-3,5-di-tert-butyl phenyl) benzotriazole, 2-(2-hydroxy-5-tert-octyl phenyl) benzotriazole, and 2-(2-hydroxy-5-(2-methacryloyl oxyethyl) phenyl)-2H-benzotriazole; a hydroxyphenyl triazine-based ultraviolet ray absorber such as 2-[4-[(2-hydroxy-3-dodecyloxypropyl) oxy]-2-hydroxyphenyl]-4,6-bis(2,4-dimethyl phenyl)-1,3,5-triazine, 2-[4-[(2-hydroxy-3-tridecyloxypropyl) oxy]-2-hydroxyphenyl]-4,6-bis(2,4-dimethyl phenyl)-1,3,5-triazine, 2-[4-[(2-hydroxy-3-(2'-ethyl) hexyl) oxy]-2-hydroxyphenyl]-4,6-bis(2,4-dimethyl phenyl)-1,3,5-triazine, 2,4-bis(2-hydroxy-4-butyroxyphenyl)-6-(2,4-bis-butyroxyphenyl)-1,3,5-triazine, and 2-(2-hydroxy-4-[1-octyloxycarbonyl ethoxy] phenyl)-4,6-bis(4-phenyl phenyl)-1,3,5-triazine; phenyl salicylate, p-tert-butyl phenyl salicylate, p-(1,1,3,3-tetramethyl butyl) phenyl salicylate, 3-hydroxyphenyl benzoate, phenylene-1,3-dibenzoate, and the like. Only one type of the ultraviolet ray absorbers can be independently used, or two or more types thereof can be used by being combined.

Among the ultraviolet ray absorbers, at least one type of ultraviolet ray absorber selected from 2-[4-[(2-hydroxy-3-dodecyloxypropyl) oxy]-2-hydroxyphenyl]-4,6-bis(2,4-dimethyl phenyl)-1,3,5-triazine, 2-[4-[(2-hydroxy-3-(2-ethyl) hexyl) oxy]-2-hydroxyphenyl]-4,6-bis(2,4-dimethyl phenyl)-1,3,5-triazine, 2,4-bis(2-hydroxy-4-butyroxyphenyl)-6-(2,4-bis-butyroxyphenyl)-1,3,5-triazine, and 2-(2-hydroxy-4-[1-octyloxycarbonyl ethoxy] phenyl)-4,6-bis(4-phenyl phenyl)-1,3,5-triazine, is more preferable, from the viewpoint of enabling the ultraviolet ray absorption power in the coated film to be sustained for a long period of time.

Further, a hydroxyphenyl triazine-based ultraviolet ray absorber of which light absorbance at 350 nm is greater than or equal to 1.0, is preferable, and specifically, at least one type of ultraviolet ray absorber selected from 2-[4-[(2-hydroxy-3-(2-ethyl) hexyl) oxy]-2-hydroxyphenyl]-4,6-bis(2,4-dimethyl phenyl)-1,3,5-triazine, 2,4-bis(2-hydroxy-4-butyroxyphenyl)-6-(2,4-bis-butyroxyphenyl)-1,3,5-triazine, and 2-(2-hydroxy-4-[1-octyloxycarbonyl ethoxy] phenyl)-4,6-bis(4-phenyl phenyl)-1,3,5-triazine, is preferable, from the viewpoint of preventing an ultraviolet ray degradation of the polycarbonate resin or the like, which is the base material.

A content rate of the component (E) in the active energy ray-curable resin composition according to the embodiment of the invention, is preferably greater than or equal to 1 part by mass, is more preferably greater than or equal to 5 parts by mass, and is even more preferably greater than or equal to 7 parts by mass, with respect to 100 parts by mass of the total of the component (A), the component (B), the component (C), and the component (D), from the viewpoint of imparting sufficient weather resistance to the cured film without decreasing curing properties. In addition, the content rate of the component (E) is preferably less than or equal to 20 parts by mass, is more preferably less than or equal to 15 parts by mass, and is even more preferably less than or equal to 12 parts by mass. In addition, the ratio of the hydroxyphenyl triazine-based ultraviolet ray absorber of which the light absorbance at 350 nm is greater than or equal to 1.0, to the component (E), is preferably greater than or equal to 10 mass %, is more preferably greater than or equal to 20 mass %, and is even more preferably greater than or equal to 30 mass %.

<Component (F)>

In a case where an ultraviolet ray is used for a curing reaction, it is preferable that the active energy ray-curable resin composition according to the embodiment of the invention contains a photopolymerization initiator (a component (F)). The photopolymerization initiator is not particularly limited insofar as having excellent compatibility with respect to the resin composition, and enabling the polymerization of an acrylic monomer or oligomer to be initiated according to ultraviolet ray irradiation. Specific examples of the photopolymerization initiator include the followings.

Specific examples of the photopolymerization initiator are capable of including a carbonyl compound such as benzoin, benzoin methyl ether, benzoin ethyl ether, benzoin isopropyl ether, benzoin isobutyl ether, acetoin, butyroin, toluoin, benzyl, benzophenone, p-methoxybenzophenone, diethoxyacetophenone, 2,2-dimethoxy-2-phenyl acetophenone, 2,2-dimethoxy-1,2-diphenyl ethan-1-one, methyl phenyl glyoxylate, ethyl phenyl glyoxylate, 4,4-bis(dimethyl aminobenzophenone), 2-hydroxy-2-methyl-1-phenyl propan-1-one, 1-hydroxycyclohexyl phenyl ketone, and 1-(4-isopropyl phenyl)-2-hydroxy-2-methyl propan-1-one; a sulfur compound such as tetramethyl thiuram disulfide; an azo compound such as azobisisobutyronitrile and azobis-2,4-dimethyl valeronitrile; a peroxide compound such as benzoyl peroxide and ditertiary butyl peroxide; and an acyl phosphine oxide compound such as 2,4,6-trimethyl benzoyl diphenyl phosphine oxide and bis(2,6-dimethoxybenzoyl)-2,4,4-trimethyl pentyl phosphine oxide.

A preferred photopolymerization initiator is benzophenone, methyl phenyl glyoxylate, 2-hydroxy-2-methyl-1-phenyl propan-1-one, 1-hydroxycyclohexyl phenyl ketone, 2,2-dimethoxy-1,2-diphenyl ethan-1-one, and 2,4,6-trimethyl benzoyl diphenyl phosphine oxide, and only one type of the photopolymerization initiators may be independently used, or two or more types thereof may be used together.

A photopolymerization initiator having maximum absorption at 360 nm to 400 nm, is preferable as the component (F) in the active energy ray-curable resin composition according to the embodiment of the invention. By using such a photopolymerization initiator, when the resin composition is cured with an ultraviolet ray, radicals are generated by the ultraviolet ray, and thus, it is possible to effectively polymerize a polymerizable monomer and a polymerizable oligomer even in a deep portion of the coated film, and to obtain the cured film excellent in the adhesiveness with respect to the base material.

The photopolymerization initiator is not necessary in a case where the active energy ray-curable resin composition according to the embodiment of the invention is cured with an active energy ray other than the ultraviolet ray, such as an electron ray, and a content rate of the component (F) in the active energy ray-curable resin composition in the case of curing the composition with the ultraviolet ray, is preferably less than or equal to 10 parts by mass, is more preferably less than or equal to 5 parts by mass, and is even more preferably less than or equal to 3 parts by mass, with respect to 100 parts by mass of the total of the component (A), the component (B), the component (C), and the component (D), from the viewpoint of preventing an adverse effect due to excessive addition. In addition, the content rate of the component (F) is preferably greater than or equal to 0.05 parts by mass, and is more preferably greater than or equal to 0.1 parts by mass, from the viewpoint of a sufficient addition effect.

<Other Components>

Various additives such as a photopolymerization initiator, a light stabilizer, an organic solvent, an antioxidant, an antiyellowing agent, a blueing agent, a pigment, a leveling agent, an antifoaming agent, a thickener, an antisettling agent, an antistatic agent, and an antifog agent, may be further compounded with the active energy ray-curable resin composition according to the embodiment of the invention, as necessary.

A solvent may be added to the active energy ray-curable resin composition according to the embodiment of the invention, as other components, and thus, it is possible to homogeneously dissolve (disperse) the components of the resin composition, or to easily apply the resin composition. That is, by adding the solvent, it is possible to improve homogeneous solubility of the components of the resin composition, dispersion stability, the adhesiveness with respect to the base material of the cured film, the smoothness and the homogeneousness of the cured film, and the like.

The type of solvent, which can be used for such a purpose, is not particularly limited, and specifically, the solvent can be suitably selected from organic solvents such as alcohol, hydrocarbon, halogenated hydrocarbon, ether, ketone, ester, and a polyvalent alcohol derivative. Furthermore, a mixed solvent in which two or more types of the solvents are mixed, may be used according to the purpose.

A content rate of the solvent in the active energy ray-curable resin composition according to the embodiment of the invention, is preferably 50 parts by mass to 500 parts by mass, and is more preferably 100 parts by mass to 300 parts by mass, with respect to the total amount 100 parts by mass of the component (A), the component (B), the component (C), and the component (D).

<Applying Method>

A method such as brush coating, spray coating, dip coating, flow coating, spin coating, and curtain coating, is used for applying the active energy ray-curable resin composition according to the embodiment of the invention, onto the base material, and it is preferable to apply the active energy ray-curable resin composition by adding a suitable organic solvent thereto, from the viewpoint of improving coating workability of the resin composition, the smoothness and the homogeneousness of the coating, and the adhesiveness of the cured film with respect to the base material. In addition, the resin composition may be applied after being heated, in order to adjust the viscosity.

The active energy ray-curable resin composition according to the embodiment of the invention, is applied onto the base material, and then, is irradiated with the active energy ray, and is crosslinked, and thus, the cured film is formed. When the resin composition is cured by being irradiated with the ultraviolet ray, the resin composition can be applied onto the base material, such that a film thickness is preferably 1 µm to 50 µm, and is more preferably 3 µm to 20 µm, and can be irradiated with an ultraviolet ray of a wavelength of 340 nm to 380 nm, at 800 mJ/cm$^2$ to 5000 mJ/cm$^2$, by using a high-pressure mercury lamp, a metal halide lamp, or the like. An irradiation atmosphere may be in the air, or may be in inert gas such as nitrogen or argon.

In the embodiment of the invention, a heating treatment step may be provided between a coating step and an active energy ray curing step. In general, the heating treatment step is performed according to the irradiation of a near-infrared ray lamp, the circulation of hot air, and the like. In a case where the active energy ray-curable resin composition according to the embodiment of the invention is applied, and then, is subjected to a heating treatment at the temperature of the front surface of the base material (hereinafter, a heating temperature) in a furnace of the heating treatment step, of 40° C. to 90° C., for a heating time of 60 seconds to 180 seconds, long-term outdoor adhesiveness becomes excellent. It is more preferable that the heating temperature is 50° C. to 70° C., and the heating time is 90 seconds to 120 seconds. In a case where the heating temperature is lower than 40° C., a large amount of organic solvents or the like remain in the coated film, and water resistance and the weather resistance easily become insufficient, and in a case where the heating temperature is higher than 90° C., appearance and the weather resistance easily become insufficient. In addition, in a case where the heating time is shorter than 90 seconds, a large amount of organic solvents or the like remain in the coated film, and the water resistance and the weather resistance easily become insufficient, and in a case where the heating time is longer than 180 seconds, the appearance and the weather resistance easily become insufficient.

<Cured Film/Molded Article>

The cured film obtained by curing the active energy ray-curable resin composition according to the embodiment of the invention, is excellent in the adhesiveness, warm water resistance, the wear resistance, and the weather resistance. For this reason, the resin composition according to this embodiment, can be used for surface modification of various synthetic resin molded articles as the base material. Examples of the synthetic resin molded article include various thermoplastic resins and thermosetting resins, which are required to improve the wear resistance, the weather resistance, or the like. Specifically, examples of the resin include a polymethyl methacryl resin, a polycarbonate resin, a polyester resin, a poly(polyester)carbonate resin, a polystyrene resin, an ABS resin, an AS resin, a polyamide resin, a polyarylate resin, a polymethacryl imide resin, a polyallyl diglycol carbonate resin, and the like. In particular, the polymethyl methacryl resin, the polycarbonate resin, the polystyrene resin, and the polymethacryl imide resin are excellent in the transparency, and are strongly required to improve the wear resistance, and thus, it is particularly effective that the resin composition according to this embodiment is applied thereto. In addition, the synthetic resin molded article is a sheet-like molded article, a film-like molded article, various injection molded articles, and the like, which are formed of the resins described above.

Among them, a molded article (a laminate) obtained by applying a polycarbonate resin onto a front surface of a molded body, by irradiating the polycarbonate resin with an active energy ray, and by forming a cured film, is suitable for a polycarbonate resin molded article for an automobile window glass substitute, or a polycarbonate resin molded article for an automobile headlamp lens.

An active energy ray-curable resin composition according to another embodiment of the invention, is an active energy ray-curable resin composition containing inorganic oxide particles having an organic functional group on a front surface, and a (meth)acrylic monomer, in which a resin laminate obtained by laminating a cured film of the active energy ray-curable resin composition on a front surface of a transparent resin base material to have a thickness of greater than or equal to 5 µm, satisfies requisites (α), (β), and (γ) described below.

(α) In a Taber wear resistance test based on ASTM D1044 (a load 500 gf (4.90 N), and 500 rotations), a haze difference before and after a wear test is less than or equal to 15%, (β) in a steel wool abrasion resistance test based on FMVSS 108 (14 kPa, steel wool #0000, and 11 reciprocal slidings), a haze difference before and after an abrasion test is less than 1%, and (γ) a haze difference of the resin laminate before and after an accelerated weather resistance test of repeating light irradiation of a sunshine carbon arc lamp type weather resistance tester based on JIS D 0205 (an irradiation intensity: 255 W/m$^2$ at 300 nm to 700 nm, continuous irradiation, a temperature: a black panel temperature of 63° C.±3° C., and rainfall for 12 minutes in 1 hour), is performed for 5000 hours, is less than or equal to 2%.

The inorganic oxide particles having the organic functional group on the front surface, are obtained by performing a coating treatment with respect to the front surface of the inorganic oxide particles with the organic functional group. In the invention, the inorganic oxide particles have the organic functional group on the front surface, and thus, are excellent in the storage stability in a coating material, and are also excellent in the compatibility with respect to a resin, and the dispersibility in the coated film.

Examples of the organic functional group include an alkyl group, a glycidyl group, a (meth)acryl group, a vinyl group, a hydroxy group, an amino group, an isocyanate group, and a mercapto group, and the (meth)acryl group, the vinyl group, and the mercapto group are preferable from the viewpoint of the compatibility and the reactivity with respect to a resin.

An inorganic oxide of the inorganic oxide particles corresponds to every oxide excluding an organic compound containing carbon and hydrogen as a main component, among compounds containing oxygen, and here, indicates non-metal oxide particles such as a metal oxide or a silicon oxide.

In the inorganic oxide particles, it is preferable that the inorganic oxide is an oxide formed of one type of inorganic component and oxygen, or a composite oxide formed of two or more types of inorganic components and oxygen. In addition, the inorganic component is an alkali metal of the group of 1, an alkali earth metal of the group of 2, a transition metal of the groups of 3 to 12, a typical metal of the groups of 13 to 15, and a semimetal such as boron, silicon, and germanium, and in two or more types of composite oxides, non-metal component such as sulfur, phosphorus, and chlorine, can also be included. Examples of the inorganic component include silicon, aluminum, titanium, tin, antimony, indium, and cadmium.

In addition, an average particle diameter of primary particles of the inorganic oxide particles, is preferably less than or equal to 500 nm, is more preferably less than or equal to 100 nm, and is even more preferably less than or equal to 50 nm, from the viewpoint of the transparency of the cured film. In addition, it is preferable that the average particle diameter of the primary particles of the inorganic oxide particles is greater than or equal to 10 nm, from the viewpoint of the wear resistance of the cured film.

Examples of the inorganic oxide particles include colloidal silica, alumina, titanium oxide, tin oxide, hetero element-doped tin oxide (antimony-doped tin oxide (ATO) or the like), indium oxide, hetero element-doped indium oxide (tin-doped indium oxide (ITO) or the like), cadmium oxide, antimony oxide, and the like. Only one type of the inorganic oxide particles may be independently used, or two or more types thereof may be used by being combined. Among them, the colloidal silica is particularly preferable from the viewpoint of the accessibility or the price, and the transparency or the wear resistance of the cured film of the composition to be obtained.

The colloidal silica can be used in a state of general water dispersion, or in a state of being dispersed in an organic solvent, and in order to homogeneously disperse a silane compound containing a silane coupling agent, it is preferable to use the colloidal silica dispersed in the organic solvent.

Furthermore, in the description of the invention, the "(meth)acrylic monomer" indicates an acrylic monomer and/or a methacrylic monomer.

Examples of the (meth)acrylic monomer include a siloxane oligomer having at least one type of functional group selected from the group consisting of a (meth)acryloyl group, an epoxy group, and a vinyl group (for example, the component (B) described above), polyfunctional (meth)acrylate represented by Formula (1) described above (for example, the component (C) described above), a urethane (meth)acrylate having two or more (meth)acryloyl groups in one molecule (for example, the component (D) described above), and the like.

Specific example of the (meth)acrylic monomer include a siloxane oligomer which is a condensate of a silane coupling agent having a (meth)acryloyl group, such as 2-(meth)acryloyl oxyethyl trimethoxysilane, 2-(meth)acryloyl oxyethyl triethoxysilane, 2-(meth)acryloyl oxyethyl methyl dimethoxysilane, 2-(meth)acryloyl oxyethyl methyl diethoxysilane, 3-(meth)acryloyl oxypropyl trimethoxysilane, 3-(meth)acryloyl oxypropyl triethoxysilane, 3-(meth)acryloyl oxypropyl methyl dimethoxysilane, 3-(meth)acryloyl oxypropyl methyl diethoxysilane, 4-(meth)acryloyl oxybutyl trimethoxysilane, 4-(meth)acryloyl oxybutyl triethoxysilane, 4-(meth)acryloyl oxybutyl methyl dimethoxysilane, and 4-(meth)acryloyl oxybutyl methyl diethoxysilane; polyfunctional (meth)acrylate such as trimethylol propane tri(meth)acrylate, EO-modified trimethylol propane tri(meth)acrylate, PO-modified trimethylol propane tri (meth)acrylate, caprolactone-modified trimethylol propane tri(meth)acrylate, pentaerythritol tri(meth)acrylate, EO-modified pentaerythritol tri(meth)acrylate, PO-modified pentaerythritol tri(meth)acrylate, caprolactone-modified pentaerythritol tri(meth)acrylate, pentaerythritol tetra(meth) acrylate, EO-modified pentaerythritol tetra(meth)acrylate, PO-modified pentaerythritol tetra(meth)acrylate, caprolactone-modified pentaerythritol tetra(meth)acrylate, dipentaerythritol penta(meth)acrylate, EO-modified dipentaerythritol penta(meth)acrylate, PO-modified dipentaerythritol penta(meth)acrylate, caprolactone-modified dipentaerythritol penta(meth)acrylate, dipentaerythritol hexa(meth)acrylate, EO-modified dipentaerythritol hexa(meth)acrylate, PO-modified dipentaerythritol hexa(meth)acrylate, caprolactone-modified dipentaerythritol hexa(meth)acrylate, 1,4-butanediol di(meth)acrylate, 1,6-hexanediol di(meth)acrylate, 1,9-nonanediol di(meth)acrylate, neopentyl glycol di(meth)acrylate, ethylene glycol di(meth)acrylate, polyethylene glycol (repeating unit n=2 to 15) di(meth) acrylate, polypropylene glycol (repeating unit n=2 to 15) di(meth)acrylate, polybutylene glycol (repeating unit n=2 to 15) di(meth)acrylate, 2,2-bis(4-(meth)acryloyl oxyethoxyphenyl) propane, 2,2-bis(4-(meth)acryloyl oxydiethoxyphenyl) propane, trimethylol propane di(meth)acrylate, tricyclodecane dimethanol diacrylate, bis(2-acryloyl oxyethyl) hydroxyethyl isocyanurate, bis(2-acryloyl oxypropyl) hydroxyethyl isocyanurate, trimethylol propane tri(meth) acrylate, trimethylol propane tri(meth)acrylate modified with caprolactone, tris(2-acryloyl oxyethyl) isocyanurate, and tris(2-acryloyl oxypropyl) isocyanurate; hydroxy(meth) acrylate such as 2-hydroxyethyl acrylate (HEA), 2-hydroxyethyl methacrylate (HEMA), 2-hydroxypropyl acrylate (HPA), 2-hydroxypropyl methacrylate (HPMA), 2-hydroxybutyl acrylate (HBA), 2-hydroxybutyl methacrylate (HBMA), an adduct of 1 mol-caprolactone of HEA (Placcel FA1), an adduct of 2 mol-caprolactone of HEA (Placcel FA2D), an adduct of 5 mol-caprolactone of HEA (Placcel FA5), an adduct of 10 mol-caprolactone of HEA (Placcel FA10L), pentaerythritol tri(meth)acrylate, dipentaerythritol tri(meth)acrylate, dipentaerythritol tetra(meth)acrylate, and dipentaerythritol penta(meth)acrylate, and urethane (meth) acrylate formed of polyisocyanate. Furthermore, "EO" indicates ethylene oxide, and "PO" indicates propylene oxide.

Among them, 3-acryloyl oxypropyl trimethoxysilane, 3-acryloyl oxypropyl triethoxysilane, 3-methacryloyl oxypropyl trimethoxysilane, 3-methacryloyl oxypropyl triethoxysilane, the 2-hydroxyethyl acrylate, the 2-hydroxypropyl acrylate, the 2-hydroxybutyl acrylate, the adduct of 1 mol-caprolactone of HEA (a product name: Placcel FA1, manufactured by Daicel Corporation), the adduct of 2 mol-caprolactone of HEA (a product name: Placcel FA2D, manufactured by Daicel Corporation), pentaerythritol triacrylate, and the like can be preferably used, from the viewpoint of the accessibility, the reactivity, the compatibility, and the like, and only one type of the (meth)acrylic monomers may be independently used, or two or more types thereof may be used together.

The active energy ray-curable resin composition according to the embodiment of the invention, may further independently contain only one type of aliphatic polyisocyanate such as hexamethylene diisocyanate (HDI), trimethyl hexamethylene diisocyanate (TMHDI), an lysine diisocyanate; alicyclic polyisocyanate such as norbornane diisocyanate (NBDI), transcyclohexane-1,4-diisocyanate, isophorone diisocyanate (IPDI), bis(isocyanate methyl) cyclohexane (hydrogenated XDI), and dicyclohexyl methane diisocyanate (hydrogenated MDI); aromatic polyisocyanate such as TDI (for example, 2,4-tolylene diisocyanate (2,4-TDI) and 2,6-tolylene diisocyanate (2,6-TDI)), MDI (for example, 4,4'-diphenyl methane diisocyanate (4,4'-MDI) and 2,4'-diphenyl methane diisocyanate (2,4'-MDI)), 1,4-phenylene diisocyanate, polymethylene polyphenylene polyisocyanate, xylene diisocyanate (XDI), tetramethyl xylene diisocyanate (TMXDI), tolidine diisocyanate (TODI), 1,5-naphthalene diisocyanate (NDI), and triphenyl methane triisocyanate; isocyanurates, adducts, and biurets thereof, and the like, or may contain two or more types thereof.

The active energy ray-curable resin composition according to the embodiment of the invention, may further contain an ultraviolet ray absorber. By using the ultraviolet ray absorber, it is possible to impart an effect of absorbing an ultraviolet ray included in solar light, to the cured film of the resin composition, and to improve the weather resistance of the base material.

The ultraviolet ray absorber is not particularly limited insofar as being capable of absorbing an ultraviolet ray, and a component which is capable of being homogeneously dissolved in the active energy ray-curable resin composition according to the embodiment of the invention, and has high ultraviolet ray absorption power, is preferable. An ultraviolet ray absorber which is a compound induced from benzophenone, benzotriazole, hydroxyphenyl triazine, phenyl salicylate, and phenyl benzoate, and has a maximum absorption wavelength in a range of 240 nm to 380 nm, is preferable from the viewpoint of excellent solubility with respect to the active energy ray-curable resin composition according to the embodiment of the invention, and an effect of improving the weather resistance of the base material. In particular, a benzophenone-based or hydroxyphenyl triazine-based ultraviolet ray absorber is preferable from the viewpoint of being contained in active energy ray-curable resin composition in large amounts, and a benzotriazole-based or hydroxyphenyl triazine-based ultraviolet ray absorber is preferable from the viewpoint of preventing the base material such as a polycarbonate resin, from being yellowed. Further, the hydroxyphenyl triazine-based ultraviolet ray absorber is more preferable from the viewpoint that it is difficult to bleed out from the coated film.

Specific examples of the ultraviolet ray absorber, include a benzophenone-based ultraviolet ray absorber such as 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydroxybenzophenone, 2-hydroxy-4-octadecyloxybenzophenone, 2,2'-dihydroxy-4-methoxybenzophenone, and 2,2'-dihydroxy-4,4'-dimethoxybenzophenone; a benzotriazole-based ultraviolet ray absorber such as 2-(2-hydroxy-5-methyl phenyl) benzotriazole, 2-(2-hydroxy-5-tert-butyl phenyl) benzotriazole, 2-(2-hydroxy-3,5-di-tert-butyl phenyl)-5-chlorobenzotriazole, 2-(2-hydroxy-3,5-di-tert-butyl phenyl) benzotriazole, 2-(2-hydroxy-5-tert-octyl phenyl) benzotriazole, and 2-(2-hydroxy-5-(2-methacryloyl oxyethyl) phenyl)-2H-benzotriazole; a hydroxyphenyl triazine-based ultraviolet ray absorber such as 2-[4-[(2-hydroxy-3-dodecyloxypropyl) oxy]-2-hydroxyphenyl]-4,6-bis(2,4-dimethyl phenyl)-1,3,5-triazine, 2-[4-[(2-hydroxy-3-tridecyloxypropyl) oxy]-2-hydroxyphenyl]-4,6-bis(2,4-dimethyl phenyl)-1,3,5-triazine, 2-[4-[(2-hydroxy-3-(2'-ethyl) hexyl) oxy]-2-hydroxyphenyl]-4,6-bis(2,4-dimethyl phenyl)-1,3,5-triazine, 2,4-bis(2-hydroxy-4-butyroxyphenyl)-6-(2,4-bis-butyroxyphenyl)-1,3,5-triazine, and 2-(2-hydroxy-4-[1-octyloxycarbonyl ethoxy] phenyl)-4,6-bis(4-phenyl phenyl)-1,3,5-triazine; phenyl salicylate, p-tert-butyl phenyl salicylate, p-(1,1,3,3-tetramethyl butyl) phenyl salicylate, 3-hydroxyphenyl benzoate, phenylene-1,3-dibenzoate, and the like. Only one type of the ultraviolet ray absorbers may be independently contained, or two or more types thereof may be contained.

Among the ultraviolet ray absorbers, at least one type of ultraviolet ray absorber selected from 2-[4-[(2-hydroxy-3-dodecyloxypropyl) oxy]-2-hydroxyphenyl]-4,6-bis(2,4-dimethyl phenyl)-1,3,5-triazine, 2-[4-[(2-hydroxy-3-(2-ethyl) hexyl) oxy]-2-hydroxyphenyl]-4,6-bis(2,4-dimethyl phenyl)-1,3,5-triazine, 2,4-bis(2-hydroxy-4-butyroxyphenyl)-6-(2,4-bis-butyroxyphenyl)-1,3,5-triazine, and 2-(2-hydroxy-4-[1-octyloxycarbonyl ethoxy] phenyl)-4,6-bis(4-phenyl phenyl)-1,3,5-triazine, is more preferable, from the viewpoint of enabling the ultraviolet ray absorption power in the coated film to be sustained for a long period of time.

Further, a hydroxyphenyl triazine-based ultraviolet ray absorber of which light absorbance at 350 nm is greater than or equal to 1.0, is preferable, and specifically, at least one type of ultraviolet ray absorber selected from 2-[4-[(2-hydroxy-3-(2-ethyl) hexyl) oxy]-2-hydroxyphenyl]-4,6-bis(2,4-dimethyl phenyl)-1,3,5-triazine, 2,4-bis(2-hydroxy-4-butyroxyphenyl)-6-(2,4-bis-butyroxyphenyl)-1,3,5-triazine, and 2-(2-hydroxy-4-[1-octyloxycarbonyl ethoxy] phenyl)-4,6-bis(4-phenyl phenyl)-1,3,5-triazine, is preferable, from the viewpoint of preventing an ultraviolet ray degradation of the polycarbonate resin or the like, which is the base material.

A content rate of the ultraviolet ray absorber in the active energy ray-curable resin composition according to the embodiment of the invention, is preferably greater than or equal to 1 part by mass, is more preferably greater than or equal to 5 parts by mass, and is even more preferably greater than or equal to 7 parts by mass, with respect to 100 parts by mass of the total of the inorganic oxide particles and the (meth)acrylic monomer, from the viewpoint of imparting sufficient weather resistance to the cured film without decreasing the curing properties. In addition, the content rate of the ultraviolet ray absorber is preferably less than or equal to 20 parts by mass, is more preferably less than or equal to 15 parts by mass, and is even more preferably less than or equal to 12 parts by mass. In addition, the ratio of the hydroxyphenyl triazine-based ultraviolet ray absorber of which the light absorbance at 350 nm is greater than or equal to 1.0, to the ultraviolet ray absorber, is preferably greater than or equal to 10 mass %, is more preferably greater than or equal to 20 mass %, and is even more preferably greater than or equal to 30 mass %.

In a case where an ultraviolet ray is used for a curing reaction, it is preferable that the active energy ray-curable resin composition according to the embodiment of the invention contains a photopolymerization initiator. The photopolymerization initiator is not particularly limited insofar as having excellent compatibility with respect to the resin composition, and enabling the polymerization of an acrylic monomer or oligomer to be initiated according to ultraviolet ray irradiation. Specific examples of the photopolymerization initiator include the followings.

Specific examples of the photopolymerization initiator are capable of including a carbonyl compound such as benzoin, benzoin methyl ether, benzoin ethyl ether, benzoin isopropyl ether, benzoin isobutyl ether, acetoin, butyroin, toluoin, benzyl, benzophenone, p-methoxybenzophenone, diethoxyacetophenone, 2,2-dimethoxy-2-phenyl acetophenone, 2,2-dimethoxy-1,2-diphenyl ethan-1-one, methyl phenyl glyoxylate, ethyl phenyl glyoxylate, 4,4-bis(dimethyl aminobenzophenone), 2-hydroxy-2-methyl-1-phenyl propan-1-one, 1-hydroxycyclohexyl phenyl ketone, and 1-(4-isopropyl phenyl)-2-hydroxy-2-methyl propan-1-one; a sulfur compound such as tetramethyl thiuram disulfide; an azo compound such as azobisisobutyronitrile and azobis-2,4-dimethyl valeronitrile; a peroxide compound such as benzoyl peroxide and ditertiary butyl peroxide; and an acyl phosphine oxide compound such as 2,4,6-trimethyl benzoyl diphenyl phosphine oxide and bis(2,6-dimethoxybenzoyl)-2,4,4-trimethyl pentyl phosphine oxide.

A preferred photopolymerization initiator is benzophenone, methyl phenyl glyoxylate, 2-hydroxy-2-methyl-1-phenyl propan-1-one, 1-hydroxycyclohexyl phenyl ketone, 2,2-dimethoxy-1,2-diphenyl ethan-1-one, and 2,4,6-trimethyl benzoyl diphenyl phosphine oxide, and only one type of the photopolymerization initiators may be independently used, or two or more types thereof may be used together.

A photopolymerization initiator having absorption maximum at 360 nm to 400 nm, is preferable as the photopolymerization initiator in the active energy ray-curable resin composition according to the embodiment of the invention. By using such a photopolymerization initiator, when the resin composition is cured with an ultraviolet ray, radicals are generated by the ultraviolet ray, and thus, it is possible to effectively polymerize a polymerizable monomer and a polymerizable oligomer even in a deep portion of the coated film, and to obtain the cured film excellent in the adhesiveness with respect to the base material.

The photopolymerization initiator is not necessary in a case where the active energy ray-curable resin composition according to the embodiment of the invention is cured with an active energy ray other than the ultraviolet ray, such as an electron ray, and a content rate of the photopolymerization initiator in the active energy ray-curable resin composition in the case of curing the composition with the ultraviolet ray, is preferably less than or equal to 10 parts by mass, is more preferably less than or equal to 5 parts by mass, and is even more preferably less than or equal to 3 parts by mass, with respect to 100 parts by mass of the total of the inorganic oxide particles and the (meth)acrylic monomer, from the viewpoint of preventing an adverse effect due to excessive addition. In addition, the content rate of the photopolymerization initiator is preferably greater than or equal to 0.05 parts by mass, and is more preferably greater than or equal to 0.1 parts by mass, from the viewpoint of a sufficient addition effect.

Various additives such as a light stabilizer, an organic solvent, an antioxidant, an antiyellowing agent, a blueing agent, a pigment, a leveling agent, an antifoaming agent, a thickener, an antisettling agent, an antistatic agent, and an antifog agent, may be further compounded with the active energy ray-curable resin composition according to the embodiment of the invention, as necessary.

A solvent may be added to the active energy ray-curable resin composition according to the embodiment of the invention, as other component, and thus, it is possible to homogeneously dissolve (disperse) the components of the resin composition, and to easily apply the resin composition. That is, by adding the solvent, it is possible to improve the homogeneous solubility of the components of the resin composition, the dispersion stability, the adhesiveness of the cured film with respect to the base material, the smoothness and the homogeneousness of the cured film, and the like.

The type of solvent, which can be used for such a purpose, is not particularly limited, and specifically, the solvent can be suitably selected from organic solvents such as alcohol, hydrocarbon, halogenated hydrocarbon, ether, ketone, ester, and a polyvalent alcohol derivative. Furthermore, a mixed solvent in which two or more types of the solvents are mixed, may be used according to the purpose.

A content rate of the solvent in the active energy ray-curable resin composition according to the embodiment of the invention, is preferably 50 parts by mass to 500 parts by mass, and is more preferably 100 parts by mass to 300 parts by mass, with respect to the total amount 100 parts by mass of the inorganic oxide particles and the (meth)acrylic monomer.

The resin laminate obtained by laminating the cured film of the active energy ray-curable resin composition according to the embodiment of the invention on the front surface of the transparent resin base material to have a thickness of greater than or equal to 5 µm, satisfies the requisites ($\alpha$), ($\beta$), and ($\gamma$) described above. The resin laminate obtained by laminating the cured film on the front surface of the transparent resin base material to have a thickness of greater than or equal to 5 µm, satisfies the requisites ($\alpha$), ($\beta$), and ($\gamma$) described above, and thus, the active energy ray-curable resin composition capable of forming the cured film excellent in the wear resistance, the abrasion resistance, and the weather resistance, is obtained.

The active energy ray-curable resin composition can be produced by being compounded with the inorganic oxide particles and the (meth)acrylic monomer at a compounding ratio such that the resin laminate obtained by laminating the cured film on the front surface of the transparent resin base material to have a thickness of greater than or equal to 5 µm, satisfies the requisites ($\alpha$), (($\beta$), and ($\gamma$) described above.

A content rate of the inorganic oxide particles in the active energy ray-curable resin composition, is preferably greater than or equal to 4 parts by mass, is more preferably greater than or equal to 5 parts by mass, is even more preferably greater than or equal to 6 parts by mass, and is particularly preferably greater than or equal to 7 parts by mass, with respect to 100 parts by mass of the total of the inorganic oxide particles and the (meth)acrylic monomer, from the viewpoint of improving the wear resistance of the cured film. In addition, the content rate of the inorganic oxide particles is preferably less than or equal to 30 parts by mass, is more preferably less than or equal to 25 parts by mass, and is even more preferably less than or equal to 20 parts by mass, from the viewpoint of the weather resistance and the heat resistance (the crack resistance) of the cured film.

In a case where the active energy ray-curable resin composition according to the embodiment of the invention is applied onto the base material, a method such as brush coating, spray coating, dip coating, flow coating, spin coating, and curtain coating, is used, and it is preferable to apply the active energy ray-curable resin composition by adding a suitable organic solvent thereto, from the viewpoint of improving the coating workability of the resin composition, the smoothness and the homogeneousness of the coating, and the adhesiveness of the cured film with respect to the base material. In addition, the resin composition may be applied after being heated, in order to adjust the viscosity.

The active energy ray-curable resin composition according to the embodiment of the invention, is applied onto the base material, and then, is irradiated with an active energy ray, and is crosslinked, and thus, the cured film is formed. When the resin composition is cured by being irradiated with the ultraviolet ray, the resin composition can be applied onto the base material such that a film thickness is preferably 1 µm to 50 µm, and is more preferably 3 µm to 20 µm, and can be irradiated with an ultraviolet ray of a wavelength of 340 nm to 380 nm, at 800 mJ/cm$^2$ to 5000 mJ/cm$^2$, by using a high-pressure mercury lamp, a metal halide lamp, or the like. An irradiation atmosphere may be in the air, or may be in inert gas such as nitrogen or argon.

In the active energy ray-curable resin composition according to the embodiment of the invention, a heating treatment step may be performed between a coating step and an active energy ray curing step. In general, the heating treatment step is performed according to the irradiation of a near-infrared ray lamp, the circulation of hot air, and the like. In a case where the active energy ray-curable resin composition according to the embodiment of the invention is applied, and then, is subjected to a heating treatment at the temperature of the front surface of the base material (hereinafter, a heating temperature) in a furnace of the heating treatment step, of 40° C. to 90° C., for a heating time of 60 seconds to 180 seconds, the long-term outdoor adhesiveness becomes excellent. It is more preferable that the heating temperature is 50° C. to 70° C., and the heating time is 90 seconds to 120 seconds. In a case where the heating temperature is lower than 40° C., a large amount of organic solvents or the like remain in the coated film, and the water resistance and the weather resistance easily become insufficient, and in a case where the heating temperature is higher than 90° C., the appearance and the weather resistance easily become insufficient. In addition, in a case where the heating time is shorter than 90 seconds, a large amount of organic solvents or the like remain in the coated film, and the water resistance and the weather resistance easily become insufficient, and in a case where the heating time is longer than 180 seconds, the appearance and the weather resistance easily become insufficient.

An active energy ray-curable resin composition according to still another embodiment of the invention, is an active energy ray-curable resin composition containing inorganic oxide particles having an organic functional group on a front surface, and a (meth)acrylic monomer, in which a resin laminate obtained by laminating a cured film of the active energy ray-curable resin composition on a front surface of a transparent resin base material to have a thickness of greater than or equal to 10 µm, satisfies requisites ($\alpha$), ($\beta$), and ($\gamma$) described below.

($\alpha$) In a Taber wear resistance test based on ASTM D1044 (a load of 500 gf (4.90 N), and 500 rotations), a haze difference before and after a wear test is less than or equal to 15%, ($\beta$) in a steel wool abrasion resistance test based on FMVSS 108 (14 kPa, steel wool #0000, and 11 reciprocal slidings), a haze difference before and after an abrasion test is less than 1%, and ($\gamma$) a haze difference of the resin laminate before and after an accelerated weather resistance test of repeating light irradiation of a sunshine carbon arc lamp type weather resistance tester based on JIS D 0205 (an irradiation intensity: 255 W/m$^2$ at 300 nm to 700 nm, continuous irradiation, a temperature: a black panel temperature of 63° C.±3° C., and rainfall for 12 minutes in 1 hour) is performed for 7000 hours, is less than or equal to 2%.

The inorganic oxide particles having the organic functional group on the front surface, are obtained by performing a coating treatment with respect to the front surface of the inorganic oxide particles with the organic functional group. In the invention, the inorganic oxide particles have the organic functional group on the front surface, and thus, are excellent in the storage stability in the coating material, and are also excellent in the compatibility with respect to a resin, and the dispersibility in the coated film.

Examples of the organic functional group include an alkyl group, a glycidyl group, a (meth)acryl group, a vinyl group, a hydroxy group, an amino group, an isocyanate group, and a mercapto group, and the (meth)acryl group, the vinyl group, and the mercapto group are preferable from the viewpoint of the compatibility and the reactivity with respect to a resin.

An inorganic oxide of the inorganic oxide particles corresponds to every oxide excluding an organic compound carbon and hydrogen as a main component, among compounds containing oxygen, and here, indicates non-metal oxide particles such as a metal oxide or a silicon oxide.

In the inorganic oxide particles, it is preferable that the inorganic oxide is an oxide formed of one type of inorganic component and oxygen, or a composite oxide formed of two or more types of inorganic components and oxygen. In addition, the inorganic component is an alkali metal of the group of 1, an alkali earth metal of the group of 2, a transition metal of the groups of 3 to 12, a typical metal of the groups of 13 to 15, and a semimetal such as boron, silicon, and germanium, and in two or more types of composite oxides, non-metal component such as sulfur, phosphorus, and chlorine, can also be included. Examples of the inorganic component include silicon, aluminum, titanium, tin, antimony, indium, and cadmium.

In addition, an average particle diameter of primary particles of the inorganic oxide particles, is preferably less than or equal to 500 nm, is more preferably less than or equal to 100 nm, and is even more preferably less than or equal to 50 nm, from the viewpoint of the transparency of the cured film. In addition, it is preferable that the average particle diameter of the primary particles of the inorganic oxide particles is greater than or equal to 10 nm, from the viewpoint of the wear resistance of the cured film.

Examples of the inorganic oxide particles include colloidal silica, alumina, titanium oxide, tin oxide, hetero element-doped tin oxide (antimony-doped tin oxide (ATO) or the like), indium oxide, hetero element-doped indium oxide (tin-doped indium oxide (ITO) or the like), cadmium oxide, antimony oxide, and the like. Only one type of the inorganic oxide particles may be independently used, or two or more types thereof may be used by being combined. Among them, the colloidal silica is particularly preferable from the viewpoint of the accessibility or the price, and the transparency or the wear resistance of the cured film of the composition to be obtained.

The colloidal silica can be used in a state of general water dispersion, or in a state of being dispersed in an organic solvent, and in order to homogeneously disperse a silane compound containing a silane coupling agent, it is preferable to use the colloidal silica dispersed in the organic solvent.

Furthermore, in the description of the invention, the "(meth)acrylic monomer" indicates an acrylic monomer and/or a methacrylic monomer.

Examples of the (meth)acrylic monomer include a siloxane oligomer having at least one type of functional group selected from the group consisting of a (meth)acryloyl group, an epoxy group, and a vinyl group (for example, the component (B) described above), polyfunctional (meth)acrylate represented by Formula (1) described above (for example, the component (C) described above), a urethane (meth)acrylate having two or more (meth)acryloyl groups in one molecule (for example, the component (D) described above), and the like.

Specific example of the (meth)acrylic monomer include the same monomers as those of the (meth)acrylic monomer described above.

Among them, the 3-acryloyl oxypropyl trimethoxysilane, the 3-acryloyl oxypropyl triethoxysilane, the 3-methacryloyl oxypropyl trimethoxysilane, the 3-methacryloyl oxypropyl triethoxysilane, the 2-hydroxyethyl acrylate, the 2-hydroxypropyl acrylate, the 2-hydroxybutyl acrylate, the adduct of 1 mol-caprolactone of HEA (a product name: Placcel FA1, manufactured by Daicel Corporation), the adduct of 2 mol-caprolactone of HEA (a product name: Placcel FA2D, manufactured by Daicel Corporation), the pentaerythritol triacrylate, and the like can be preferably used, from the viewpoint of the accessibility, the reactivity, the compatibility, and the like, and only one type of the (meth)acrylic monomers may be independently used, or two or more types thereof may be used together.

The active energy ray-curable resin composition according to the embodiment of the invention, may further independently contain only one type of aliphatic polyisocyanate such as hexamethylene diisocyanate (HDI), trimethyl hexamethylene diisocyanate (TMHDI), and lysine diisocyanate; alicyclic polyisocyanate such as norbornane diisocyanate (NBDI), transcyclohexane-1,4-diisocyanate, isophorone diisocyanate (IPDI), bis(isocyanate methyl) cyclohexane (hydrogenated XDI), and dicyclohexyl methane diisocyanate (hydrogenated MDI); aromatic polyisocyanate such as TDI (for example, 2,4-tolylene diisocyanate (2,4-TDI) and 2,6-tolylene diisocyanate (2,6-TDI)), MDI (for example, 4,4'-diphenyl methane diisocyanate (4,4'-MDI) and 2,4'-diphenyl methane diisocyanate (2,4'-MDI)), 1,4-phenylene diisocyanate, polymethylene polyphenylene polyisocyanate, xylene diisocyanate (XDI), tetramethyl xylene diisocyanate (TMXDI), tolidine diisocyanate (TODI), 1,5-naphthalene diisocyanate (NDI), and triphenyl methane triisocyanate; isocyanurates, adducts, and biurets thereof and the like, or may contain two or more types thereof.

The active energy ray-curable resin composition according to the embodiment of the invention, may further contain an ultraviolet ray absorber. By using the ultraviolet ray absorber, it is possible to impart an effect of absorbing an ultraviolet ray included in solar light, to the cured film of the resin composition, and to improve the weather resistance of the base material.

The ultraviolet ray absorber is not particularly limited insofar as being capable of absorbing an ultraviolet ray, and a component which is capable of being homogeneously dissolved in the active energy ray-curable resin composition according to the embodiment of the invention, and has high ultraviolet ray absorption power, is preferable. An ultraviolet ray absorber which is a compound induced from benzophenone, benzotriazole, hydroxyphenyl triazine, phenyl salicylate, and phenyl benzoate, and has a maximum absorption wavelength in a range of 240 to 380 nm, is preferable from the viewpoint of excellent solubility with respect to the active energy ray-curable resin composition according to the embodiment of the invention, and an effect of improving the weather resistance of the base material. In particular, a benzophenone-based or hydroxyphenyl triazine-based ultraviolet ray absorber is preferable from the viewpoint of being contained in active energy ray-curable resin composition in large amounts, and a benzotriazole-based or hydroxyphenyl triazine-based ultraviolet ray absorber is preferable from the viewpoint of preventing the base material such as a polycarbonate resin, from being yellowed. Further, the hydroxyphenyl triazine-based ultraviolet ray absorber is more preferable from the viewpoint that it is difficult to bleed out from the coated film.

Specific examples of the ultraviolet ray absorber, include the same ultraviolet ray absorbers as those of the ultraviolet ray absorber described above. Only one type of the ultraviolet ray absorbers may be independently contained, or two or more types thereof may be contained.

Among the ultraviolet ray absorbers, at least one type of ultraviolet ray absorber selected from 2-[4-[(2-hydroxy-3-dodecyloxypropyl) oxy]-2-hydroxyphenyl]-4,6-bis(2,4-dimethyl phenyl)-1,3,5-triazine, 2-[4-[(2-hydroxy-3-(2-ethyl) hexyl) oxy]-2-hydroxyphenyl]-4,6-bis(2,4-dimethyl phenyl)-1,3,5-triazine, 2,4-bis(2-hydroxy-4-butyroxyphenyl)-6-(2,4-bis-butyroxyphenyl)-1,3,5-triazine, and 2-(2-hydroxy-4-[1-octyloxycarbonyl ethoxy] phenyl)-4,6-bis(4-phenyl phenyl)-1,3,5-triazine, is more preferable, from the viewpoint of enabling the ultraviolet ray absorption power in the coated film to be sustained for a long period of time.

Further, a hydroxyphenyl triazine-based ultraviolet ray absorber of which light absorbance at 350 nm is greater than or equal to 1.0, is preferable, and specifically, at least one type of ultraviolet ray absorber selected from 2-[4-[(2-hydroxy-3-(2-ethyl) hexyl) oxy]-2-hydroxyphenyl]-4,6-bis(2,4-dimethyl phenyl)-1,3,5-triazine, 2,4-bis(2-hydroxy-4-butyroxyphenyl)-6-(2,4-bis-butyroxyphenyl)-1,3,5-triazine, and 2-(2-hydroxy-4-[1-octyloxycarbonyl ethoxy] phenyl)-4,6-bis(4-phenyl phenyl)-1,3,5-triazine, is preferable, from the viewpoint of preventing an ultraviolet ray degradation of the polycarbonate resin or the like, which is the base material.

A content rate of the ultraviolet ray absorber in the active energy ray-curable resin composition according to the embodiment of the invention, is preferably greater than or equal to 1 part by mass, is more preferably greater than or equal to 3 parts by mass, and is even more preferably greater than or equal to 5 parts by mass, with respect to 100 parts by mass of the total of the inorganic oxide particles and the (meth)acrylic monomer, from the viewpoint of imparting sufficient weather resistance to the cured film without decreasing the curing properties. In addition, the content rate of the ultraviolet ray absorber is preferably less than or equal to 18 parts by mass, is more preferably less than or equal to 13 parts by mass, and is even more preferably less than or equal to 10 parts by mass. In addition, the ratio of the hydroxyphenyl triazine-based ultraviolet ray absorber of which the light absorbance at 350 nm is greater than or equal to 1.0, to the ultraviolet ray absorber, is preferably greater than or equal to 12 mass %, is more preferably greater than or equal to 22 mass %, and is even more preferably greater than or equal to 32 mass %.

In a case where an ultraviolet ray is used for a curing reaction, it is preferable that the active energy ray-curable resin composition according to the embodiment of the invention contains a photopolymerization initiator. The photopolymerization initiator is not particularly limited insofar as having excellent compatibility with respect to the resin composition, and enabling the polymerization of an acrylic monomer or oligomer to be initiated according to ultraviolet ray irradiation. Specific examples of the photopolymerization initiator include the followings.

Specific examples of the photopolymerization initiator are capable of including a carbonyl compound such as benzoin, benzoin methyl ether, benzoin ethyl ether, benzoin isopropyl ether, benzoin isobutyl ether, acetoin, butyroin, toluoin, benzyl, benzophenone, p-methoxybenzophenone, diethoxyacetophenone, 2,2-dimethoxy-2-phenyl acetophenone, 2,2-dimethoxy-1,2-diphenyl ethan-1-one, methyl phenyl glyoxylate, ethyl phenyl glyoxylate, 4,4-bis(dimethyl aminobenzophenone), 2-hydroxy-2-methyl-1-phenyl propan-1-one, 1-hydroxycyclohexyl phenyl ketone, and 1-(4-isopropyl phenyl)-2-hydroxy-2-methyl propan-1-one; a sulfur compound such as tetramethyl thiuram disulfide; an azo compound such as azobisisobutyronitrile and azobis-2,4-dimethyl valeronitrile; a peroxide compound such as benzoyl peroxide and ditertiary butyl peroxide; and an acyl phosphine oxide compound such as 2,4,6-trimethyl benzoyl diphenyl phosphine oxide and bis(2,6-dimethoxybenzoyl)-2,4,4-trimethyl pentyl phosphine oxide.

A preferred photopolymerization initiator is benzophenone, methyl phenyl glyoxylate, 2-hydroxy-2-methyl-1-phenyl propan-1-one, 1-hydroxycyclohexyl phenyl ketone, 2,2-dimethoxy-1,2-diphenyl ethan-1-one, and 2,4,6-trimethyl benzoyl diphenyl phosphine oxide, and only one type of the photopolymerization initiators may be independently used, or two or more types thereof may be used together.

A photopolymerization initiator having absorption maximum at 360 nm to 400 nm, is preferable as the photopolymerization initiator in the active energy ray-curable resin composition according to the embodiment of the invention. By using such a photopolymerization initiator, when the resin composition is cured with an ultraviolet ray, radicals are generated by the ultraviolet ray, and thus, it is possible to effectively polymerize a polymerizable monomer and a polymerizable oligomer even in a deep portion of the coated film, and to obtain the cured film excellent in the adhesiveness with respect to the base material.

The photopolymerization initiator is not necessary in a case where the active energy ray-curable resin composition according to the embodiment of the invention is cured with an active energy ray other than the ultraviolet ray, such as an electron ray, and a content rate of the photopolymerization initiator in the active energy ray-curable resin composition in the case of curing the composition with the ultraviolet ray, is preferably less than or equal to 10 parts by mass, is more preferably less than or equal to 5 parts by mass, and is even more preferably less than or equal to 3 parts by mass, with respect to 100 parts by mass of the total of the inorganic oxide particles and the (meth)acrylic monomer, from the viewpoint of preventing an adverse effect due to excessive addition. In addition, the content rate of the photopolymerization initiator is preferably greater than or equal to 0.05 parts by mass, and is more preferably greater than or equal to 0.1 parts by mass, from the viewpoint of a sufficient addition effect.

Various additives such as a light stabilizer, an organic solvent, an antioxidant, an antiyellowing agent, a blueing agent, a pigment, a leveling agent, an antifoaming agent, a thickener, an antisettling agent, an antistatic agent, and an antifog agent, may be further compounded with the active energy ray-curable resin composition according to the embodiment of the invention, as necessary.

A solvent may be added to the active energy ray-curable resin composition according to the embodiment of the invention, as other components, and thus, it is possible to homogeneously dissolve (disperse) the components of the resin composition, and to easily apply the resin composition. That is, by adding the solvent, it is possible to improve the homogeneous solubility of the components of the resin composition, the dispersion stability, the adhesiveness of the cured film with respect to the base material, the smoothness and the homogeneousness of the cured film, and the like.

The type of solvent, which can be used for such a purpose, is not particularly limited, and specifically, the solvent can be suitably selected from organic solvents such as alcohol, hydrocarbon, halogenated hydrocarbon, ether, ketone, ester, and a polyvalent alcohol derivative. Furthermore, a mixed solvent in which two or more types of the solvents are mixed, may be used according to the purpose.

A content rate of the solvent in the active energy ray-curable resin composition according to the embodiment of the invention, is preferably 50 parts by mass to 500 parts by mass, and is more preferably 100 parts by mass to 300 parts by mass, the total amount 100 parts by mass of the inorganic oxide particles and the (meth)acrylic monomer.

The resin laminate obtained by laminating the cured film of the active energy ray-curable resin composition according to the embodiment of the invention on the front surface of the transparent resin base material to have a thickness of greater than or equal to 10 μm, satisfies the requisites (α), (β), and (γ) described above. The resin laminate obtained by laminating the cured film on the front surface of the transparent resin base material to have a thickness of greater than or equal to 10 μm, satisfies the requisites (α), (β), and (γ) described above, and thus, the active energy ray-curable resin composition capable of forming the cured film excellent in the wear resistance, the abrasion resistance, and the weather resistance, is obtained. In addition, the condition of the weather resistance test (exposure) is changed from the thickness of the cured film of 5 μm and the test time of 5000 hours to the thickness of the cured film of 10 μm and the test time of 7000 hours, and thus, the weather resistance of the active energy ray-curable resin composition to be obtained, is further improved.

The active energy ray-curable resin composition can be produced by being compounded with the inorganic oxide particles and the (meth)acrylic monomer at a compounding ratio such that the resin laminate obtained by laminating the cured film on the front surface of the transparent resin base material to have a thickness of greater than or equal to 10 μm, satisfies the requisites (α), (β), and (γ) described above.

A content rate of the inorganic oxide particles in the active energy ray-curable resin composition, is preferably greater than or equal to 6 parts by mass, is more preferably greater than or equal to 7 parts by mass, is even more preferably greater than or equal to 8 parts by mass, and is particularly preferably greater than or equal to 9 parts by mass, with respect to 100 parts by mass of the total of the inorganic oxide particles and the (meth)acrylic monomer, from the viewpoint of improving the wear resistance of the cured film. In addition, the content rate of the inorganic oxide particles is preferably less than or equal to 28 parts by mass, is more preferably less than or equal to 23 parts by mass, and is even more preferably less than or equal to 18 parts by mass, from the viewpoint of the weather resistance and the heat resistance (the crack resistance) of the cured film.

In a case where the active energy ray-curable resin composition according to the embodiment of the invention is applied onto the base material at the time of producing the active energy ray-curable resin composition, a method such as brush coating, spray coating, dip coating, flow coating, spin coating, and curtain coating, is used, and it is preferable to apply the active energy ray-curable resin composition by adding a suitable organic solvent thereto, from the viewpoint of improving the coating workability of the resin composition, the smoothness and the homogeneousness of the coating, and the adhesiveness of the cured film with respect to the base material. In addition, the resin composition may be applied after being heated, in order to adjust the viscosity.

When the active energy ray-curable resin composition according to the embodiment of the invention is produced, the active energy ray-curable resin composition is applied onto the base material, and then, is irradiated with an active energy ray, and is crosslinked, and thus, the cured film is formed. When the resin composition is cured by being irradiated with the ultraviolet ray, the resin composition can be applied onto the base material such that a film thickness is preferably 1 μm to 50 μm, and is more preferably 3 μm to 20 μm, and can be irradiated with an ultraviolet ray of a wavelength of 340 nm to 380 nm, at 800 mJ/cm$^2$ to 5000 mJ/cm$^2$, by using a high-pressure mercury lamp, a metal halide lamp, or the like. An irradiation atmosphere may be in the air, or may be in inert gas such as nitrogen or argon.

When the active energy ray-curable resin composition according to the embodiment of the invention is produced, a heating treatment step may be performed between a coating step and an active energy ray curing step. In general, the heating treatment step is performed according to the irradiation of a near-infrared ray lamp, the circulation of hot air, and the like. In a case where the active energy ray-curable resin composition according to the embodiment of the invention is applied, and then, is subjected to a heating treatment at the temperature of the front surface of the base material (hereinafter, a heating temperature) in a furnace of the heating treatment step, of 40° C. to 90° C., for a heating time of 60 seconds to 180 seconds, the long-term outdoor adhesiveness becomes excellent. It is more preferable that the heating temperature is 50° C. to 70° C., and the heating time is 90 seconds to 120 seconds. In a case where the heating temperature is lower than 40° C., a large amount of organic solvents or the like remain in the coated film, and the water resistance and the weather resistance easily become insufficient, and in a case where the heating temperature is higher than 90° C., the appearance and the weather resistance easily become insufficient. In addition, in a case where the heating time is shorter than 90 seconds, a large amount of organic solvents or the like remain in the coated film, and the water resistance and the weather resistance easily become insufficient, and in a case where the heating time is longer than 180 seconds, the appearance and the weather resistance easily become insufficient.

EXAMPLES

Hereinafter, the invention will be described in more detail, by using examples. Furthermore, "parts" in examples and comparative examples described below, indicate "parts by mass". In addition, evaluation in the examples and the comparative examples, was performed by the following method.

<Appearance and Transparency of Cured Film>
(1) Surface Smoothness

A cured film of a laminate obtained by forming the cured film on a front surface of a resin molded plate, was visually observed, and was determined on the basis of the following criteria.

○: Having surface smoothness
x: Orange peel (2) Transparency

A haze value [%] of the laminate was measured by using a hazemeter HM-150 (Product Name) manufactured by Murakami Color Research Laboratory Co., Ltd., on the basis of JIS K7136:2000.

<Adhesiveness>

The adhesiveness of the cured film of the laminate was evaluated in the following procedure. Scratches reaching 11 base materials were formed on a front surface of the cured film with a cutter such that 100 cells were formed at an interval of 1.5 mm in horizontal and vertical, and a cellophane adhesive tape (a width of 25 mm, manufactured by Nichiban Co., Ltd.) was pressure-bonded onto the cells, and were rapidly peeled off. The evaluation of the adhesiveness was determined on the basis of the following criteria according to the number of remaining cells/the total number of cells (100) and visual observation.

○: 100/100 (neither peeling nor chipping occurs).

Δ: 100/100 (peeling does not occurs but chipping occurs in the vicinity of the cut).

x: 0/100 to 99/100 (peeling occurs).

<Wear Resistance>

A Taber type wear tester was used on the basis of ASTM D1044, and the cured film of the laminate was worn 500 rotations with a wear wheel CS-10F, at a load of 500 gf (4.90 N). After that, the cured film was washed with a neutral detergent, a haze value was measured on the basis of JIS K7136:2000, and an increase haze value (a haze difference) before and after the wear test was calculated. The wear resistance was determined on the basis of the following criteria.

⊙: The increase haze value is less than 10%.

○: The increase haze value is greater than or equal to 10% and less than or equal to 15%.

x: The increase haze value is greater than 15%.

<Abrasion Resistance>

The front surface of the cured film of the laminate was subjected to a abrasion resistance test of performing 11 reciprocal slidings with commercially available steel wool (a product name: Bon Star #0000, manufactured by Nippon Steel Wool Co., Ltd.), at a load of 14 kPa, on the basis of FMVSS 108. After that, the cured film was washed with a neutral detergent, a haze value was measured on the basis of JIS K7136:2000, and an increase haze value before and after the measurement was calculated. The abrasion resistance was determined on the basis of the following criteria.

⊙: The increase haze value is less than 0.3%

○: The increase haze value is greater than or equal to 0.3% and less than 1.0% x: The increase haze value is greater than or equal to 1.0%

<Warm Water Resistance>

The laminate was put into hot water at 80° C. for 2 hours, and then, was evaluated by the same method as that of the evaluation of the adhesiveness described above.

<Heat Resistance>

The laminate was put into a drying machine at 120° C. for 24 hours, and then, the appearance of the cured film was visually observed, and was determined on the basis of the following criteria.

○: No change x: Cracks occur

<Weather Resistance>

The surface of the cured film of the laminate was subjected to a test in a cycle of an irradiation intensity of 255 W/m² (300 nm to 700 nm), continuous irradiation, a black panel temperature of 63±3° C., and rainfall for 12 minutes in 1 hour, by using a weather resistance tester (a sunshine weather meter (Product Name), a sunshine carbon arc lamp type weather resistance tester, manufactured by Suga Tester Co., Ltd.), on the basis of JIS D 0205. At this time, a laminate in which a cured film having a thickness of 5 μm was formed, and a laminate in which a cured film having a thickness of 10 μm was formed, were prepared, and the cured film having a thickness of 5 μm was subjected to a weather resistance test (exposure) for 5000 hours, and the cured film having a thickness of 10 μm was subjected to a weather resistance test (exposure) for 7000 hours. A change in the cured film after the exposure was evaluated as follows.

(1) Appearance

The appearance of the laminate after the weather resistance test described above was visually observed, and was determined on the basis of the following criteria.

○: Spontaneous peeling does not occur on the cured film.

x: Spontaneous peeling is observed on the cured film.

(2) Haze

The degree of transparency of the laminate after the weather resistance test described above, was measured by using a hazemeter (HM-150W (Product Name), manufactured by Murakami Color Research Laboratory Co., Ltd.), on the basis of JIS K7136:2000, and an increase haze value (a haze difference) before and after the test was calculated. The determination was performed on the basis of the following criteria.

⊙: The increase haze value is less than 1%.

○: The increase haze value is greater than or equal to 1% and less than or equal to 2%.

x: The increase haze value is greater than 2%.

(3) YI

The yellowness (a yellow index: YI) of the laminate after the weather resistance test described above, was measured by using a spectral colorimeter (CM-5 (Product Name), manufactured by Konica Minolta Co., Ltd.), on the basis of ASTM E313-96, and was determined on the basis of the following criteria.

⊙: The YI value is less than 3.

○: The YI value is greater than or equal to 3 and less than 6.

x: The YI value is greater than or equal to 6.

[Preparation of Solution (CS-1) Containing Surface-Modified Particles]

120 g of isopropanol dispersed silica sol (IPA-ST (Product Name), manufactured by Nissan Chemical Industries Ltd.); a dispersion medium: isopropanol, a $SiO_2$ concentration: 30 mass %, and an average particle diameter of primary particles: 15 nm, hereinafter simply referred to as "IPA-ST"), as the inorganic oxide particles, and 22.9 g of 3-methacryloyl oxypropyl trimethoxysilane (KBM-503 (Product Name), manufactured by Shin-Etsu Chemical Co., Ltd., which can be represented by Formula (2), and corresponds to a case of $R^1$=a 3-methacryloyl oxypropyl group, n=1, and $R^2$=a methyl group, and hereinafter, simply referred to as "KBM-503"), were put into a three-necked flask of 200 milliliters, provided with a stirrer, a thermometer, and a condenser, and were heated while being stirred, 8.3 g of deionized water was added at the same time when the reflux of volatile components was started, and a hydrolysis reaction and a dehydration condensation reaction were performed while performing stirring for 2 hours under reflux. The volatile components such as alcohol and water, were distillated in a normal pressure state, and 72 g of toluene was added at a time point when a solid content concentration was approximately 60 mass %, alcohol, water, or the like was subjected to azeotropic distillation along with toluene while being stirred for 3 hours under reflux, and thus, a toluene dispersion system was obtained. Further, a reaction was performed at approximately 110° C. for 4 hours while distillating toluene. A toluene solution (CS-1) containing the obtained surface-modified particles, was yellow and a transparent and viscous liquid of a Newtonian fluid, and a solid content concentration was 60 mass % in the heating residue.

[Confirmation of Component Amount in Solution (CS-1) Containing Surface-Modified Particles]

The amount of component (A) (hereinafter, a "component (A-1)") and the amount of component (B) (hereinafter, a "component (B-1)"), contained in the solution (CS-1) prepared by the method described above, were confirmed in the following procedure. Reprecipitation was performed by slowly adding 50 g of the solution (CS-1) while stirring 500 ml of hexane, a hexane solution after solid-liquid separation, was subjected to vacuum concentration, and thus, the mass of the component (B-1) contained in the solution (CS-1), was measured. The content of the component (B-1) contained in the solid content of the solution (CS-1), was 43 mass % ((A-1)/(B-1) was 1.3). In addition, measurement was performed by GPC, in the condition described above, and thus, a Mw of the component (B-1) was 1533.

[Synthesis of Surface-Modified Particles (CS-2)]

120 g of MEK dispersed silica sol (MEK-ST (Product Name), manufactured by Nissan Chemical Industries Ltd.); a dispersion medium: methyl ethyl ketone (MEK), a $SiO_2$ concentration: 30 mass %, and an average particle diameter of primary particles; 15 nm, and hereinafter, simply referred to as "MEK-ST"), as the inorganic oxide particles, and 3.6 g of "KBM-503", were put into a three-necked flask of 200 milliliter, provided with a stirrer, a thermometer, and a condenser, and were heated while being stirred, 0.8 g of deionized water was added at the same time when the reflux of volatile components was started, and a hydrolysis reaction and a dehydration condensation reaction were performed while performing stirring for 2 hours under reflux. The volatile components such as alcohol, water, and MEK, were distillated in a normal pressure state, while being stirred for 4 hours under reflux. Further, a reaction was performed at approximately 80° C. for 2 hours. A MEK solution (CS-2) containing the obtained surface-modified particles, was pale yellow and a transparent liquid of a Newtonian fluid, and a solid content concentration was 50 mass % in the heating residue.

[Confirmation of Component Amount in Solution (CS-2) Containing Surface-Modified Particles]

The amount of component (A) (hereinafter, a "component (A-2)") and the amount of component (B) (hereinafter, a "component (B-2)"), contained in the solution (CS-2) prepared by the method described above, were confirmed in the following procedure. Reprecipitation was performed by slowly adding 50 g of the solution (CS-2) while stirring 500 ml of hexane, a hexane solution after solid-liquid separation, was subjected to vacuum concentration, and thus, the mass of the component (B-2) contained in the solution (CS-2), was measured. The content of the component (B-2) contained in the solid content of the solution (CS-2), was 12.5 mass % ((A-2)/(B-2) was 7.0). In addition, measurement was performed by GPC, in the condition described above, and thus, a weight average molecular weight Mw of the component (B-2) was 727.

[Synthesis of Siloxane Oligomer (B-3)]

84 g of isopropyl alcohol and 46 g of "KBM-503" were put into a three-necked flask of 200 milliliter, provided with a stirrer, a thermometer, and a condenser, and were heated while being stirred, 16.7 g of deionized water was added at the same time when the reflux of volatile components was started, and a hydrolysis reaction and a dehydration condensation reaction were performed while performing stirring for 2 hours under reflux. The volatile components such as alcohol and water, were distillated in a normal pressure state, 72 g of toluene was added at a time point when a solid content concentration was approximately 60 mass %, alcohol, water, or the like was subjected to azeotropic distillation along with toluene while being stirred for 3 hours under reflux, and thus, a toluene solution was obtained. Further, a reaction was performed at approximately 110° C. for 4 hours while distillating toluene. The obtained toluene solution (B-3) of a siloxane oligomer was a transparent liquid, and a solid content concentration was 50 mass % in the heating residue. In addition, a measurement was performed by GPC in the condition described above, and thus, a weight average molecular weight Mw of the component (B-3) was 1992.

[Synthesis of Component (D-1)]

530 g (2 mol) of dicyclohexyl methane diisocyanate and 300 ppm of di-n-butyl tin dilaurate, were put into a flask of a heat retention function, provided with a drop funnel, a reflux cooler, a stirring blade, and a temperature sensor, and were heated to 40° C. After that, 800 g (1 mol) of polycarbonate diol (a product name: Kuraray Polyol C-770, manufactured by Kuraray Co., Ltd., a weight average molecular weight of 800), as the polyol compound, was dropped for 4 hours. Heating was performed to 70° C. for 1 hour after performing stirring at 40° C. for 2 hours. After that, 232 g (2 mol) of 2-hydroxyethyl acrylate (HEA) was dropped for 2 hours, and was stirred for 2 hours, and thus, urethane acrylate (D-1) was obtained as the component (D).

[Synthesis of Component (D-2)]

504 g (1 mol) of an isocyanurate type trimer of hexamethylene diisocyanate (a product name: DURANATE TPA-100, manufactured by Asahi Kasei Corporation), and 300 ppm of di-n-butyl tin dilaurate, were put into a flask of a heat retention function, provided with a drop funnel, a reflux cooler, a stirring blade, and a temperature sensor, and were heated to 60° C. 690 g (3 mol) of an adduct of 1 mol-caprolactone (Placcel FA1) of 2-hydroxyethyl acrylate (HEA), as an alkyl mono(meth)acrylate compound having a hydroxyl group, was dropped for 3 hours. Further, stirring was performed at 60° C. for 3 hours, and thus, urethane acrylate (D-2) was obtained as the component (D).

Example 1

A resin composition was prepared at a compounding ratio shown in Table 1 (a numerical value in the table, indicates parts by mass), was subjected to spray coating on a polycarbonate resin injection molded plate (Panlite L-1225Z-100 (Product Name), clear, manufactured by Teijin Limited) to have a thickness of 3 mm, and was heated and dried at 60° C. for 100 seconds in an IR drying furnace. Next, the dried sample was irradiated with an ultraviolet ray of 2,000 $mJ/cm^2$ (ultraviolet ray cumulative energy a wavelength of 340 nm to 380 nm, measured by an ultraviolet ray actinometer UV-351 (Product Name) manufactured by Oak Manufacturing Co., Ltd.), by using a high-pressure mercury lamp in an air atmosphere, and thus, a wear resistance polycarbonate resin plate (a laminate) in which a film thickness of a cured film was 9 μm to 12 μm, was obtained. Coated film performance evaluation results are shown in Table 1.

Examples 2 to 16

Cured films were formed in the same condition as that in Example 1, except that resin compositions were prepared at compounding ratios shown in Table 1 (numerical values in the table, indicate parts by mass), and thus, laminates were obtained. Evaluation results are shown in Table 1.

Comparative Examples 1 to 7

Cured films were formed in the same condition as that of Example 1, except that resin compositions were prepared at compounding ratios shown in Table 2 (numerical values in the table, indicate parts by mass), and thus, laminates were obtained. Evaluation results are shown in Table 2.

TABLE 1

|  |  |  | Example 1 | Example 2 | Example 3 | Example 4 | Example 5 | Example 6 | Example 7 | Example 8 |
|---|---|---|---|---|---|---|---|---|---|---|
| Compound of resin composition (parts by mass) | Component (A) (solid content) | A-1 | 5.1 | 4.5 | 10 | 20 |  |  |  | 5.1 |
|  |  | A-2 |  |  |  |  | 10 | 10 | 10 |  |
|  |  | MEK-ST |  |  |  |  |  |  |  |  |
|  | Component (B) | B-1 | 3.9 | 3.5 | 7.7 | 15.4 |  |  |  | 3.9 |
|  |  | B-2 |  |  |  |  | 1.4 | 1.4 | 1.4 |  |
|  |  | B-3 |  |  | 0.4 |  | 6.3 | 2.0 | 0.6 |  |
|  | Component (A)/Component (B) |  | (1.3) | (1.2) | (1.3) | (1.3) | (1.3) | (2.9) | (5.0) | (1.3) |
|  | Component (C) | DPCA-20 | 67 | 67 | 60.3 | 34.6 | 60.3 | 63.6 | 68 | 47 |
|  |  | DPCA-60 |  |  |  |  |  |  |  | 20 |
|  | Others | TAIC |  |  |  |  |  |  |  |  |
|  | Component (D) (solid content) | D-1 | 24 | 24 | 22 | 30 | 22 | 23 | 24 | 24 |
|  |  | D-2 |  |  |  |  |  |  |  |  |
|  | Component (E) | Tinuvin 400 | 7 | 7 | 7 | 7 | 7 | 7 | 7 | 7 |
|  |  | Tinuvin 479 | 3 | 3 | 3 | 3 | 3 | 3 | 3 | 3 |
|  |  | Tinuvin PS |  |  |  |  |  |  |  |  |
|  |  | Hostavin 3206 |  |  |  |  |  |  |  |  |
|  | Photopolymerization initiator | Component (F) | TPO | 1 | 1 | 1 | 1 | 1 | 1 | 1 | 1 |
|  |  | Others | BP | 1 | 1 | 1 | 1 | 1 | 1 | 1 | 1 |
|  |  |  | MPG | 1 | 1 | 1 | 1 | 1 | 1 | 1 | 1 |
|  |  |  | BDK | 1 | 1 | 1 | 1 | 1 | 1 | 1 | 1 |
|  | Light stabilizer | Tinuvin 123 | 0.5 | 0.5 | 0.5 | 0.5 | 0.5 | 0.5 | 0.5 | 0.5 |
|  | Leveling agent | L-7001 | 0.3 | 0.3 | 0.3 | 0.3 | 0.3 | 0.3 | 0.3 | 0.3 |
|  | Organic solvent | PGM | 100 | 100 | 100 | 100 | 100 | 100 | 100 | 100 |
| Evaluation result | 1. Appearance of cured film | (1) Surface smoothness | ○ | ○ | ○ | ○ | ○ | ○ | ○ | ○ |
|  |  | (2) Haze [%] | 0.3 | 0.3 | 0.4 | 0.5 | 0.3 | 0.3 | 0.3 | 0.3 |
|  | 2. Adhesiveness |  | ○ | ○ | ○ | ○ | ○ | ○ | ○ | ○ |
|  | 3. Wear resistance |  | ⊚ | ⊚ | ⊚ | ⊚ | ⊚ | ⊚ | ⊚ | ○ |
|  | Top: Evaluation, Bottom: Increase haze value [%] |  | 6.4 | 6.8 | 5.7 | 4.6 | 5.9 | 4.8 | 4.3 | 12.5 |
|  | 4. Abrasion resistance |  | ⊚ | ⊚ | ⊚ | ○ | ⊚ | ○ | ○ | ○ |
|  | Top: Evaluation, Bottom: Increase haze value [%] |  | 0.1 | 0.1 | 0.2 | 0.7 | 0.2 | 0.4 | 0.6 | 0.5 |
|  | 5. Warm water resistance |  | ○ | ○ | ○ | ○ | ○ | ○ | ○ | ○ |
|  | 6. Heat resistance |  | ○ | ○ | ○ | ○ | ○ | ○ | ○ | ○ |
|  | 7. Weather resistance (5 μm, 5000 hrs) | (1) Appearance | ○ | ○ | ○ | ○ | ○ | ○ | ○ | ○ |
|  |  | (2) Haze | ⊚ | ⊚ | ⊚ | ○ | ⊚ | ⊚ | ○ | ⊚ |
|  |  | Top: Evaluation, Bottom: Increase haze value [%] | 0.5 | 0.4 | 0.8 | 1.6 | 0.6 | 0.9 | 1.4 | 0.3 |
|  |  | (3) YI | ⊚ | ⊚ | ⊚ | ⊚ | ⊚ | ⊚ | ⊚ | ⊚ |
|  |  | Top: Evaluation, Bottom: YI value | 1.2 | 1.2 | 2.3 | 2.8 | 1.4 | 1.9 | 2.5 | 1.1 |
|  | 8. Weather resistance (10 μm, 7000 hrs) | (2) Haze | ⊚ | ⊚ | ○ | X | ⊚ | ○ | X | ⊚ |
|  |  | Top: Evaluation, Bottom: Increase haze value [%] | 0.9 | 0.8 | 1.5 | 3.1 | 0.9 | 1.7 | 2.9 | 0.8 |

|  |  |  | Example 9 | Example 10 | Example 11 | Example 12 | Example 13 | Example 14 | Example 15 | Example 16 |
|---|---|---|---|---|---|---|---|---|---|---|
| Compound of resin composition (parts by mass) | Component (A) (solid content) | A-1 | 10 | 5.1 | 5.1 | 5.1 | 5.1 | 5.1 | 5.1 | 5.1 |
|  |  | A-2 |  |  |  |  |  |  |  |  |
|  |  | MEK-ST |  |  |  |  |  |  |  |  |
|  | Component (B) | B-1 | 7.7 | 3.9 | 3.9 | 3.9 | 3.9 | 3.9 | 3.9 | 3.9 |
|  |  | B-2 |  |  |  |  |  |  |  |  |
|  |  | B-3 |  |  |  |  |  |  |  |  |
|  | Component (A)/Component (B) |  | (1.3) | (1.3) | (1.3) | (1.3) | (1.3) | (1.3) | (1.3) | (1.3) |
|  | Component (C) | DPCA-20 |  | 67 | 67 | 67 | 67 | 67 | 67 | 60 |
|  |  | DPCA-60 | 60.3 |  |  |  |  |  |  |  |
|  | Others | TAIC |  |  |  |  |  |  |  | 7 |
|  | Component (D) (solid content) | D-1 | 22 |  | 24 | 24 | 24 | 24 | 24 | 24 |
|  |  | D-2 |  | 24 |  |  |  |  |  |  |
|  | Component (E) | Tinuvin 400 | 7 | 7 | 10 |  |  |  | 7 | 7 |
|  |  | Tinuvin 479 | 3 | 3 |  |  |  |  | 3 | 3 |
|  |  | Tinuvin PS |  |  |  | 10 |  |  |  |  |
|  |  | Hostavin 3206 |  |  |  |  | 10 |  |  |  |
|  | Photopolymerization initiator | Component (F) | TPO | 1 | 1 | 1 | 1 | 1 | 1 |  |  |
|  |  | Others | BP | 1 | 1 | 1 | 1 | 1 | 1 | 1 | 1 |
|  |  |  | MPG | 1 | 1 | 1 | 1 | 1 | 1 | 1 | 1 |
|  |  |  | BDK | 1 | 1 | 1 | 1 | 1 | 1 | 2 | 2 |
|  | Light stabilizer | Tinuvin 123 | 0.5 | 0.5 | 0.5 | 0.5 | 0.5 | 0.5 | 0.5 | 0.5 |
|  | Leveling agent | L-7001 | 0.3 | 0.3 | 0.3 | 0.3 | 0.3 | 0.3 | 0.3 | 0.3 |
|  | Organic solvent | PGM | 100 | 100 | 100 | 100 | 100 | 100 | 100 | 100 |

TABLE 1-continued

| | | | | | | | | | | |
|---|---|---|---|---|---|---|---|---|---|---|
| Evaluation result | 1. Appearance of cured film | (1) Surface smoothness | ○ | ○ | ○ | ○ | ○ | ○ | ○ | ○ |
| | | (2) Haze [%] | 0.4 | 0.3 | 0.3 | 0.3 | 0.3 | 0.3 | 0.3 | 0.3 |
| | 2. Adhesiveness | | ○ | ○ | ○ | ○ | ○ | ○ | ○ | ○ |
| | 3. Wear resistance | | ○ | ◎ | ◎ | ◎ | ◎ | ◎ | ◎ | ○ |
| | Top: Evaluation, Bottom: Increase haze value [%] | | 14.8 | 8.3 | 7.3 | 8.9 | 7.1 | 6.9 | 6.6 | 7.0 |
| | 4. Abrasion resistance | | ○ | ◎ | ◎ | ◎ | ◎ | ◎ | ◎ | ○ |
| | Top: Evaluation, Bottom: Increase haze value [%] | | 0.9 | 0.2 | 0.1 | 0.2 | 0.2 | 0.1 | 0.0 | 0.4 |
| | 5. Warm water resistance | | ○ | Δ | ○ | Δ | ○ | ○ | Δ | ○ |
| | 6. Heat resistance | | ○ | ○ | ○ | ○ | ○ | ○ | ○ | ○ |
| 7. Weather resistance (5 μm, 5000 hrs) | (1) Appearance | | ○ | ○ | ○ | ○ | ○ | ○ | ○ | ○ |
| | (2) Haze | | ◎ | ○ | ◎ | ◎ | ○ | ○ | ◎ | ◎ |
| | Top: Evaluation, Bottom: Increase haze value [%] | | 0.5 | 1.0 | 0.8 | 0.6 | 1.6 | 1.9 | 0.5 | 0.5 |
| | (3) YI | | ◎ | ◎ | ◎ | ◎ | ○ | ○ | ◎ | ◎ |
| | Top: Evaluation, Bottom: YI value | | 1.3 | 2.1 | 1.4 | 1.0 | 3.1 | 4.5 | 1.2 | 1.2 |
| 8. Weather resistance (10 μm, 7000 hrs) | (2) Haze | | ◎ | X | ○ | ◎ | X | X | ◎ | ◎ |
| | Top: Evaluation, Bottom: Increase haze value [%] | | 0.9 | 2.5 | 1.5 | 0.8 | 3.6 | 4.1 | 0.9 | 0.9 |

TABLE 2

| | | | Comparative Example 1 | Comparative Example 2 | Comparative Example 3 | Comparative Example 4 |
|---|---|---|---|---|---|---|
| Compound of resin composition (parts by mass) | Component (A)(solid content) | A-1 | | | 5.1 | 5.1 |
| | | A-2 | | | | |
| | | MEK-ST | | 9.0 | | |
| | Component (B) | B-1 | 90 | | 3.9 | 3.9 |
| | | B-2 | | | | |
| | | B-3 | | | | |
| | Component (A)/Component (B) | | (—) | (—) | (1.3) | (1.3) |
| | Component (C) | DPCA-20 | 67 | 67 | | 91 |
| | | DPCA-60 | | | | |
| | Others | TAIC | | | 67 | |
| | Component (D)(solid content) | D-1 | 24 | 24 | 24 | |
| | | D-2 | | | | |
| | Component (E) | Tinuvin 400 | 7 | 7 | 7 | 7 |
| | | Tinuvin 479 | 3 | 3 | 3 | 3 |
| | | Tinuvin PS | | | | |
| | | Hostavin 3206 | | | | |
| Photo-polymerization initiator | Component (F) | TPO | 1 | 1 | 1 | 1 |
| | Others | BP | 1 | 1 | 1 | 1 |
| | | MPG | 1 | 1 | 1 | 1 |
| | | BDK | 1 | 1 | 1 | 1 |
| | Light stabilizer | Tinuvin 123 | 0.5 | 0.5 | 0.5 | 0.5 |
| | Leveling agent | L-7001 | 0.3 | 0.3 | 0.3 | 0.3 |
| | Organic solvent | PGM | 100 | 100 | 100 | 100 |
| Evaluation result | 1. Appearance of cured film | (1) Surface smoothness | ○ | X | ○ | ○ |
| | | (2) Haze [%] | 0.3 | 0.4 | 0.3 | 0.3 |
| | 2. Adhesiveness | | ○ | ○ | ○ | X |
| | 3. Wear resistance | | X | ◎ | ○ | ◎ |
| | Top: Evaluation, Bottom: Increase haze value [%] | | 36.3 | 8.6 | 13.5 | 5.8 |
| | 4. Abrasion resistance | | ○ | X | X | ◎ |
| | Top: Evaluation, Bottom: Increase haze value [%] | | 0.9 | 1.5 | 2.7 | 0.2 |
| | 5. Warm water resistance | | ○ | ○ | ○ | ○ |
| | 6. Heat resistance | | ○ | ○ | ○ | X |
| 7. Weather resistance (5 μm, 5000 hrs) | (1) Appearance | | ○ | ○ | ○ | X |
| | (2) Haze | | ◎ | ○ | ○ | X |
| | Top: Evaluation, Bottom: Increase haze value [%] | | 0.9 | 1.6 | 1.5 | 16.7 |
| | (3) YI | | ◎ | ○ | ○ | X |
| | Top: Evaluation, Bottom: YI value | | 2.6 | 5.3 | 3.7 | 7.5 |
| 8. Weather resistance (10 μm, 7000 hrs) | (2) Haze | | ○ | X | X | X |
| | Top: Evaluation, Bottom: Increase haze value [%] | | 1.8 | 4.1 | 3.7 | 39.2 |

TABLE 2-continued

|  |  |  | Comparative Example 5 | Comparative Example 6 | Comparative Example 7 |
|---|---|---|---|---|---|
| Compound of resin composition (parts by mass) | Component (A)(solid content) | A-1 | 5.1 | 5.1 | 5.1 |
|  |  | A-2 |  |  |  |
|  |  | MEK-ST |  |  |  |
|  | Component (B) | B-1 | 3.9 | 3.9 | 3.9 |
|  |  | B-2 |  |  |  |
|  |  | B-3 |  |  |  |
|  | Component (A)/Component (B) |  | (1.3) | (1.3) | (1.3) |
|  | Component (C) | DPCA-20 |  | 67 | 29 |
|  |  | DPCA-60 | 91 |  |  |
|  | Others | TAIC |  |  | 38 |
|  | Component (D)(solid content) | D-1 |  | 24 | 24 |
|  |  | D-2 |  |  |  |
|  | Component (E) | Tinuvin 400 | 7 |  | 7 |
|  |  | Tinuvin 479 | 3 |  | 3 |
|  |  | Tinuvin PS |  |  |  |
|  |  | Hostavin 3206 |  |  |  |
|  | Photo-polymerization initiator | Component (F) TPO | 1 | 1 | 1 |
|  |  | Others BP | 1 | 1 | 1 |
|  |  | MPG | 1 | 1 | 1 |
|  |  | BDK | 1 | 1 | 1 |
|  | Light stabilizer | Tinuvin 123 | 0.5 | 0.5 | 0.5 |
|  | Leveling agent | L-7001 | 0.3 | 0.3 | 0.3 |
|  | Organic solvent | PGM | 100 | 100 | 100 |
| Evaluation result | 1. Appearance of cured film | (1) Surface smoothness | ○ | ○ | ○ |
|  |  | (2) Haze [%] | 0.3 | 0.3 | 0.3 |
|  | 2. Adhesiveness |  | X | ○ | ○ |
|  | 3. Wear resistance |  | ◎ | ◎ | ○ |
|  | Top: Evaluation, Bottom: Increase haze value [%] |  | 7.1 | 9.5 | 11.6 |
|  | 4. Abrasion resistance |  | ○ | ◎ | X |
|  | Top: Evaluation, Bottom: Increase haze value [%] |  | 0.5 | 0.1 | 1.9 |
|  | 5. Warm water resistance |  | ○ | ○ | ○ |
|  | 6. Heat resistance |  | X | ○ | ○ |
|  | 7. Weather resistance (5 μm, 5000 hrs) | (1) Appearance | X | X | ○ |
|  |  | (2) Haze | X | X | ◎ |
|  |  | Top: Evaluation, Bottom: Increase haze value [%] | 14.3 | 9.2 | 0.5 |
|  |  | (3) YI | X | X | ◎ |
|  |  | Top: Evaluation, Bottom: YI value | 7.1 | 10.5 | 1.0 |
|  | 8. Weather resistance (10 μm, 7000 hrs) | (2) Haze | X | X | X |
|  |  | Top: Evaluation, Bottom: Increase haze value [%] | 31.6 | 23.3 | 23.3 |

Furthermore, the compounds in Table 1 and Table 2 are as follows.

MEK-ST: an MEK dispersed colloidal silica solution (manufactured by Nissan Chemical Industries Ltd.), a product name: MEK-ST, DPCA-20: 2 mol-caprolactone-modified dipentaerythritol hexaacrylate (manufactured by Nippon Kayaku Co., Ltd., a product name: kayarad DPCA-20), DPCA-60: 6 mol-caprolactone-modified dipentaerythritol hexaacrylate (manufactured by Nippon Kayaku Co., Ltd., a product name: kayarad DPCA-60), TAIC: tris(2-acryloyl oxyethyl) isocyanurate (manufactured by MT Aqua Polymer Co., Ltd., a product name: Aronix M-315), Tinuvin 400: 2-[4-[(2-hydroxy-3-dodecyloxypropyl)oxy]-2-hydroxyphenyl]-4,6-bis(2,4-dimethyl phenyl)-1,3,5-triazine (manufactured by BASF Japan Co., Ltd., a product name: Tinuvin 400), Tinuvin 479: 2-(2-hydroxy-4-[1-octyloxycarbonyl ethoxy] phenyl)-4,6-bis(4-phenyl phenyl)-1,3,5-triazine (manufactured by BASF SE, a product name: Tinuvin 479), Tinuvin PS: 2-(2-hydroxy-5-tert-butyl phenyl) benzotriazole (manufactured by BASF SE, a product name: Tinuvin PS), Hostavin 3206: 4-dodecyl-2'-ethoxyoxalanilide (manufactured by Clariant Chemicals Co., Ltd., a product name: Hostavin 3206), TPO: 2,4,6-trimethyl benzoyl diphenyl phosphine oxide (manufactured by BASF SE, a product name: Irgacure TPO), BP: benzophenone, MPG: methyl phenyl glyoxylate (manufactured by BASF SE, a product name: Irgacure MBF), BDK: benzyl dimethyl ketal (manufactured by BASF SE, a product name: Irgacure 651), Tinuvin 123: a reaction product of decanedioic acid bis(2,2,6,6-tetramethyl-1-(octyl oxy)-4-piperidinyl) ester, 1,1-dimethyl ethyl hydroperoxide, and octane (manufactured by BASF Japan Co., Ltd., a product name: Tinuvin 123), L-7001: polyether modified polydimethyl siloxane (manufactured by Dow Corning Toray Co., Ltd., a product name: L-7001), and PGM: propylene glycol monomethyl ether.

As shown in Table 1, the resin compositions of Examples 1 to 15 contain all of the components (A) to (E), and a contain ratio of each of the components is in a more preferred range. For this reason, each of the evaluation results was excellent.

The resin compositions of Examples 1 to 10, 12, 15, and 16, contain an ultraviolet ray absorber (Tinuvin 479) of which light absorbance at 350 nm is greater than or equal to 1.0, as the component (E), and thus, the weather resistance (the yellowing resistance) of the laminate was excellent, compared to the resin compositions of Examples 11, 13, and 14, not containing the ultraviolet ray absorber (Tinuvin 479).

The resin composition of Example 1 contains a photopolymerization initiator as the component (F), and thus, the warm water resistance (the adhesiveness) of the laminate was excellent, compared to the resin composition of Example 15, not containing the photopolymerization initiator.

As shown in Table 2, the resin composition of Comparative Example 1 does not contain the component (A), and thus, the wear resistance of the cured film was poor. In contrast, the cured films of the resin compositions of Examples 1 to 15, were excellent in the wear resistance.

The resin composition of Comparative Example 2 does not contain the component (B), and thus, the compatibility between the component (A) and the other components was poor, the smoothness of the coated film was poor, and the abrasion resistance was also poor. In contrast, the cured films of the resin compositions of Examples 1 to 15, were excellent in both of the smoothness and the abrasion properties of the coated film.

The resin composition of Comparative Example 3 does not contain the component (C), but contains triacrylate (TAIC) having a isocyanurate skeleton. For this reason, the abrasion resistance of the cured film was poor. In contrast, the cured films of the resin compositions of Examples 1 to 15, were excellent in the abrasion resistance. From such results, it is known that excellent abrasion properties can be obtained by mainly containing the component (B) and the component (C).

The resin compositions of Comparative Examples 4 and 5 do not contain the component (D), and thus, the adhesiveness, the heat resistance, and the weather resistance of the cured film were poor. In contrast, the cured films of the resin compositions of Examples 1 to 15, were excellent in the adhesiveness, the heat resistance, and the weather resistance.

The resin composition of Comparative Example 6 does not contain the component (E), and thus, the weather resistance of the laminate was poor. In contrast, the cured films of the resin compositions of Examples 1 to 15, were excellent in the weather resistance. From such results, it is known that excellent weather resistance can be obtained by mainly containing the component (D) and the component (E). In addition, it is known that excellent adhesiveness and excellent heat resistance can be obtained by mainly containing the component (D).

The resin composition of Comparative Example 7 contains triacrylate (TAIC) having an isocyanurate skeleton, as (meth)acrylate other than three components of the component (A), the component (B), and the component (D), and the component (C), and the content of the component (C) with respect to 100 parts by mass of the total of the (meth)acrylate other than three components of the component (A), the component (B), and the component (D), is less than 60 parts by mass, and thus, the abrasion resistance and the weather resistance (10 μm, and 7000 hrs) of the laminate were poor. In contrast, the cured films of the resin compositions of Examples 1 to 15, excellent in the abrasion resistance and the weather resistance (10 μm and 7000 hrs).

From such results, it is known that excellent abrasion resistance and excellent weather resistance can be obtained by setting the content of the component (C) with respect to 100 parts by mass of the total of the (meth)acrylate other than three components of the component (A), the component (B), and the component (D), to be greater than or equal to 60 parts by mass.

INDUSTRIAL APPLICABILITY

By applying the active energy ray-curable resin composition according to the embodiment of the invention onto a plastic base material to be exposed to outdoor solar light, such as an automotive headlamp lens, it is possible to protect a lens from abrasion at the time of washing the car for a long period of time, or from an ultraviolet ray included in solar light, and to maintain excellent appearance. Accordingly, it is possible to ensure an excellent visual field, and thus, to contribute to safety at the time of night driving.

The invention claimed is:
1. An active energy ray-curable resin composition, comprising:
a component (A): inorganic oxide particles having an organic functional group on a front surface;
a component (B): a siloxane oligomer having at least one type of functional group selected from the group consisting of a (meth)acryloyl group, an epoxy group, and a vinyl group, of which a weight average molecular weight is 200 to 3000;
a component (C): polyfunctional (meth)acrylate represented by Formula (1) described below;
a component (D): urethane (meth)acrylate containing two or more (meth)acryloyl groups in one molecule; and
a component (E): an ultraviolet ray absorber,
wherein with respect to 100 parts by mass of the total of the components (A), (B), (C), and (D),
a content of the component (A) is 4 parts by mass to 30 parts by mass,
a content of the component (B) is 2 parts by mass to 20 parts by mass,
a content of the component (C) is 30 parts by mass to 80 parts by mass, and
a content of the component (D) is 5 parts by mass to 50 parts by mass, and
the content of the component (C) is greater than or equal to 60 parts by mass, with respect to 100 parts by mass of the total of (meth)acrylate other than three components of the component (A), the component (B), and the component (D),

[Chemical Formula 1]

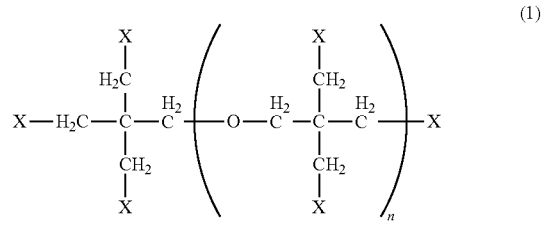

in the formula, at least three of the X groups, are each independently,
a modified group ($CH_2$=CR—CO($OC_2H_4$)$_y$—O—) of a (meth)acryloyl group modified with ethylene oxide (R represents a hydrogen atom or a methyl group, and y represents an integer of greater than or equal to 1 and less than or equal to 5),
a modified group $(CH_2\!=\!CR\!-\!CO(OC_3H_6)_y\!-\!O\!-\!)$ of a (meth)acryloyl group modified with propylene oxide (R represents a hydrogen atom or a methyl group, and y represents an integer of greater than or equal to 1 and less than or equal to 5),
a modified group $(CH_2\!=\!CR\!-\!CO(O(CH_2)_5C\!=\!O)_y\!-\!O\!-\!)$ of a (meth)acryloyl group modified with caprolactone (R represents a hydrogen atom or a methyl group, and y represents an integer of greater than or equal to 1 and less than or equal to 5), or
a (meth)acryloyl oxy group $(CH_2\!=\!CR\!-\!COO\!-\!)$ (R represents a hydrogen atom or a methyl group), and
the remaining Xs are a methyl group or a hydroxy group (—OH), and n is an integer of 0 to 4.

2. The active energy ray-curable resin composition according to claim 1,
wherein a mass ratio (A/B) of the component (A) to the component (B), is in a range of 0.5 to 8.

3. The active energy ray-curable resin composition according to claim 1,
wherein the component (D) is a reactant of,
diisocyanate having an alicyclic structure,
polycarbonate polyol having a branched alkyl structure, of which a number average molecular weight is in a range of 500 to 1000, and
mono(meth)acrylate having a hydroxyl group.

4. The active energy ray-curable resin composition according to claim 1,
wherein the component (E) contains a hydroxyphenyl triazine-based ultraviolet ray absorber.

5. The active energy ray-curable resin composition according to claim 1,
wherein the component (E) contains an ultraviolet ray absorber of which a light absorbance at a wavelength of 350 nm is greater than or equal to 1.0.

6. The active energy ray-curable resin composition according to claim 1, further comprising:
a photopolymerization initiator having maximum absorption at a wavelength of 360 nm to 400 nm, as a component (F).

7. The active energy ray-curable resin composition according to claim 1, wherein a resin laminate obtained by laminating a cured film of the active energy ray-curable resin composition on a front surface of a transparent resin base material to have a thickness of greater than or equal to 5 μm, satisfies requisites (α), (β), and (γ) described below,
(α) in a Taber wear resistance test based on ASTM D1044 (a load 500 gf (4.90 N), and 500 rotations), a haze difference before and after a wear test is less than or equal to 15%,
(β) in a steel wool abrasion resistance test based on FMVSS 108 (14 kPa, steel wool #0000, and 11 reciprocal slidings), a haze difference before and after an abrasion test is less than 1%, and
(γ) a haze difference of the resin laminate before and after an accelerated weather resistance test of repeating light irradiation of a sunshine carbon arc lamp type weather resistance tester based on JIS D 0205 (an irradiation intensity: 255 W/m² at 300 nm to 700 nm, continuous irradiation, a temperature: a black panel temperature of 63° C.±3° C., and rainfall for 12 minutes in 1 hour), is performed for 5000 hours, is less than or equal to 2%.

8. The active energy ray-curable resin composition according to claim 1, wherein a resin laminate obtained by laminating a cured film of the active energy ray-curable resin composition on a front surface of a transparent resin base material to have a thickness of greater than or equal to 10 μm, satisfies requisites (α), (β), and (γ) described below,
(α) in a Taber wear resistance test based on ASTM D1044 (a load of 500 gf (4.90 N), and 500 rotations), a haze difference before and after a wear test is less than or equal to 15%,
(β) in a steel wool abrasion resistance test based on FMVSS 108 (14 kPa, steel wool #0000, and 11 reciprocal slidings), a haze difference before and after an abrasion test is less than 1%, and
(γ) a haze difference of the resin laminate before and after an accelerated weather resistance test of repeating light irradiation of a sunshine carbon arc lamp type weather resistance tester based on JIS D 0205 (an irradiation intensity: 255 W/m² at 300 nm to 700 nm, continuous irradiation, a temperature: a black panel temperature of 63° C.±3° C., and rainfall for 12 minutes in 1 hour) is performed for 7000 hours, is less than or equal to 2%.

9. A resin molded article,
wherein a cured film of the active energy ray-curable resin composition according to claim 1, is formed on a front surface of a resin molding base.

10. The resin molded article according to claim 9,
wherein the resin molded article is an automotive headlamp lens.

11. A method of producing the resin molded article according to claim 9, the method comprising:
a step of applying the active energy ray-curable resin composition onto the front surface of the resin molding base, and of irradiating the active energy ray-curable resin composition with an active energy ray.

12. A resin molded article,
wherein a cured film of the active energy ray-curable resin composition according to claim 7, is formed on a front surface of a resin molding base.

13. The resin molded article according to claim 12,
wherein the resin molded article is an automotive headlamp lens.

14. A resin molded article,
wherein a cured film of the active energy ray-curable resin composition according to claim 8, is formed on a front surface of a resin molding base.

15. The resin molded article according to claim 14,
wherein the resin molded article is an automotive headlamp lens.

16. A method of producing the resin molded article according to claim 12, the method comprising:
a step of applying the active energy ray-curable resin composition onto the front surface of the resin molding base, and of irradiating the active energy ray-curable resin composition with an active energy ray.

17. A method of producing the resin molded article according to claim 14, the method comprising:
a step of applying the active energy ray-curable resin composition onto the front surface of the resin molding base, and of irradiating the active energy ray-curable resin composition with an active energy ray.

* * * * *